(12) United States Patent
Liu

(10) Patent No.: US 11,610,539 B2
(45) Date of Patent: Mar. 21, 2023

(54) DISPLAY PANEL AND DISPLAY DEVICE

(71) Applicant: Hubei Yangtze Industrial Innovation Center Of Advanced Display Co., Ltd., Wuhan (CN)

(72) Inventor: Shaowei Liu, Wuhan (CN)

(73) Assignee: Hubei Yangtze Industrial Innovation Center Of Advanced Display Co., Ltd., Wuhan (CN)

( * ) Notice: Subject to any disclaimer, the term of this patent is extended or adjusted under 35 U.S.C. 154(b) by 0 days.

(21) Appl. No.: 17/659,491

(22) Filed: Apr. 18, 2022

(65) Prior Publication Data

US 2022/0238068 A1 Jul. 28, 2022

(30) Foreign Application Priority Data

Dec. 31, 2021 (CN) .......................... 202111673803.X

(51) Int. Cl.
*G09G 3/32* (2016.01)

(52) U.S. Cl.
CPC ....... *G09G 3/32* (2013.01); *G09G 2310/0202* (2013.01); *G09G 2310/0251* (2013.01); *G09G 2310/08* (2013.01)

(58) Field of Classification Search
CPC ............. G09G 3/32; G09G 2310/0202; G09G 2310/0251; G09G 2310/08; G09G 2300/0426; G09G 3/3233; G09G 2300/0819; G09G 2300/0842; G09G 2300/0861; G09G 2310/0262; G09G 2310/0297

See application file for complete search history.

(56) References Cited

U.S. PATENT DOCUMENTS

| | | | | |
|---|---|---|---|---|
| 8,767,159 | B2 * | 7/2014 | Kimura | G09G 3/3659 349/48 |
| 11,073,941 | B1 * | 7/2021 | Wu | G09G 3/3233 |
| 2013/0335307 | A1 * | 12/2013 | Guo | G09G 3/3233 345/76 |
| 2017/0200417 | A1 * | 7/2017 | Wu | G09G 3/3233 |

FOREIGN PATENT DOCUMENTS

CN 105761675 A 7/2016

* cited by examiner

*Primary Examiner* — Andrew Sasinowski
(74) *Attorney, Agent, or Firm* — Kilpatrick Townsend & Stockton, LLP

(57) ABSTRACT

Provided are a display panel and a display device. The display panel includes data lines arranged along the row direction, the operation of the data lines includes a data writing phase; and at least one data line meets the following: the at least one data line receives a data signal, while at least one of the other data lines receives a reset signal simultaneously. According to the provided display panel, the data reset process of the at least one data line overlaps with the data writing process of the other data lines.

19 Claims, 14 Drawing Sheets

DISPLAY PANEL AND DISPLAY DEVICE

CROSS-REFERENCE TO RELATED APPLICATIONS

This application claims priority to Chinese patent application No. 202111673803.X filed with the China National Intellectual Property Administration (CNIPA) on Dec. 31, 2021, the disclosure of which is incorporated herein by reference in its entirety.

FIELD

The present disclosure relates to the field of display technology and, in particular, to a display panel and a display device.

BACKGROUND

A display panel is equipped with data lines for transmitting data signals. The data signals are usually provided to data lines, and then the data signals stored on the data lines are written into pixels through a pixel driving circuit to charge the pixels.

The insufficient charging time for the pixels caused by resetting the data lines may affect the display effect.

SUMMARY

The present disclosure provides a display panel and a display device to avoid insufficient pixel charging time in the related art.

The present disclosure provides a display panel. The display panel includes multiple data lines arranged along a row direction, the operation of the multiple data lines includes a data writing phase; and at least one data line of the multiple data lines meets the following that the at least one data line receives a data signal, and at least one of the multiple data lines except the at least one data line receiving the data signal receives a reset signal simultaneously.

Based on the same concept, the present disclosure further provides a display device, and the display device includes a display panel. The display panel includes multiple data lines arranged along a row direction, the operation of the multiple data lines includes a data writing phase; and at least one data line of the multiple data lines meets the following that the at least one data line receives a data signal, and at least one of the multiple data lines except the at least one data line receiving the data signal receives a reset signal simultaneously.

BRIEF DESCRIPTION OF DRAWINGS

In order to more clearly illustrate the embodiments of the present disclosure or the related art, the following is a brief description of accompanying drawings that need to be used in the description of the embodiments or the related art. Apparently, although the accompanying drawings in the following description are some specific embodiments of the present disclosure, and driving method and manufacturing method revealed and suggested by various embodiments of the present disclosure to other structures and drawings, which are undoubtedly within the scope of the claims of the present disclosure.

DETAILED DESCRIPTION

In order to make embodiments of the present disclosure will be clearly and completely described below through embodiments with reference to accompanying drawings in the embodiments of the present disclosure. Apparently, the described embodiments are only part not all embodiments of the present disclosure. Based on the basic concepts revealed and suggested by the embodiments of the present disclosure, all other embodiments derived by a person skilled in the art shall fall within the protection scope of the present disclosure.

An embodiment of the present disclosure provides a display panel. The display panel includes multiple data lines arranged along the row direction, the operation of the data lines includes a data writing phase; and at least one data line meets the following condition: the at least one data line receives a data signal, while at least one of the multiple data lines except the at least one data line receiving the data signal receives a reset signal simultaneously.

According to the display panel provided in the embodiment of the present disclosure, the at least one data line is set to receive the data signal, while at least one of the multiple data lines except the at least one data line receiving the data signal is set to receive the reset signal simultaneously, i.e., the data reset process of the at least one data line overlaps with the data writing process of the multiple data lines except the at least one data line receiving the data signal, and thus the data reset process of the data lines does not occupy the data writing time, and the charging time of sub-pixels can be extended and the display effect of the display panel can be improved.

The above are the embodiments of the present disclosure are described in detail below in combination with accompanying drawings in the embodiments of the present disclosure.

Since the data signals are written line by line, in order to avoid the pixel storage capacitor in the previous line being pre-written into a pixel by the residual potential of a parasitic capacitor on the data line, causing subsequent lower voltage data to be unable to be written into the pixel resulting in display abnormalities, it is necessary to reset the potential of the data line after each writing of the data signals to the pixels.

Currently, the process of resetting the potential of the data line takes up charging time, causing insufficient charging time for the pixels and affecting the display.

Figure 1:
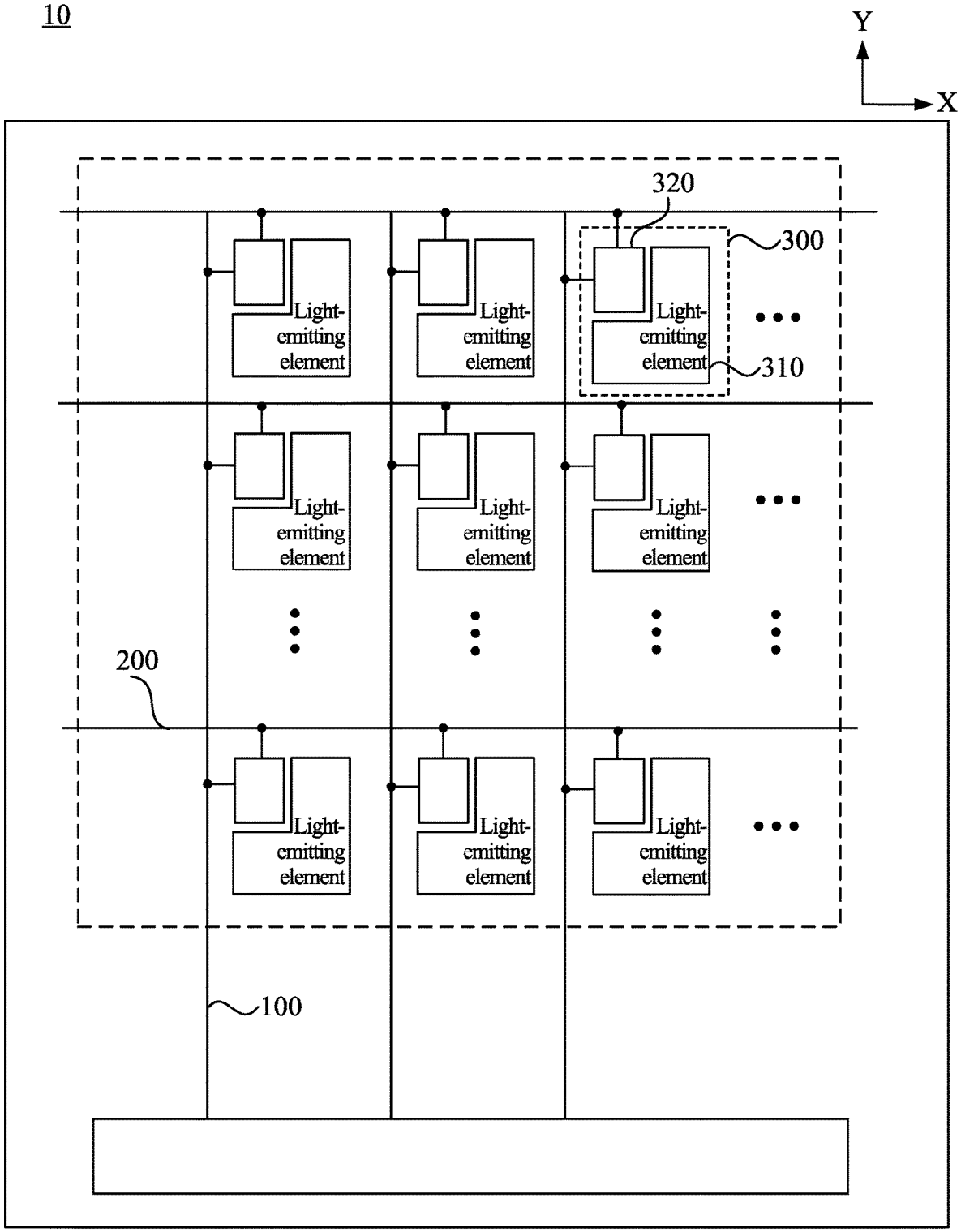
FIG. 1 is a structure diagram of a display panel according to an embodiment of the present disclosure.

Exemplarily, FIG. 1 is a structure diagram of a display panel according to an embodiment of the present disclosure. Referring to FIG. 1, a display panel 10 provided in the embodiment of the present disclosure includes data lines 100 arranged along a row direction, and the operation of the data lines 100 includes a data writing phase; and at least one of the data lines 100 meets the following condition: the at least one of the data lines 100 receives a data signal, while at least one of the other data lines 100 receives a reset signal simultaneously.

In the embodiment, the display panel 10 is provided with data lines 100 arranged along the row direction X, scan lines 200 arranged along the column direction Y, and sub-pixels 300 arranged in an array. Each sub-pixel 300 includes a light-emitting element 310 and a pixel circuit 320 which are electrically connected. The pixel circuit 320 is electrically connected to a data line 100 and a scan line 200, respectively, and the data line 100 transmits the data signal to the pixel circuit 320, and the scan line 200 transmits a scan signal to the pixel circuit 320, and the pixel circuit 320 drives the light-emitting element 310 to emit light according to the data signal and the scan signal, thus image display is achieved.

For sub-pixels 300 in the same row, the data writing phase, i.e., the charging process, of data lines 100, is carried out in a time-division manner. In an embodiment, along the row direction X, the display panel 10 sequentially provides the data signal to the data lines 100 electrically connected to the sub-pixels 300 in the same row, and the data signal on the data lines 100 is written into the corresponding sub-pixel 300. The at least one of the data lines 100 is set to receive the data signal, while at least one of the other data lines 100 is set to receive the reset signal simultaneously. Exemplarily, if the display panel 10 includes a $1^{st}$ data line, a $2^{nd}$ data line, and a $3^{rd}$ data line which are arranged sequentially along the row direction X, and when the $1^{st}$ data line is receiving the data signal for a data writing process, the $2^{nd}$ data line and/or the $3^{rd}$ data line may receive the reset signal to perform a reset process. Thus, before receiving the data signal again next time, the $2^{nd}$ data line and/or the $3^{rd}$ data line do not need to set up an additional reset process, and the data signal may be directly received to charge the sub-pixels 300 without the occupation of charging time, i.e., the data reset process of at least one of the data lines 100 may overlap with the data writing process of the other data lines 100 without the occupation of charging time, and the charging time of the sub-pixels 300 can be extended, and the display effect of the display panel 10 can be improved.

It should be noted that at least one of the data lines 100 meets the following condition that the at least one of the data lines 100 receives the data signal and at least one of the other data lines 100 receives the reset signal simultaneously may be understood that in the data lines 100, the data writing process of one data line 100 may be set to overlap with the data reset process of one or more other data lines 100, or the data writing process of any one data line 100 of multiple or even all data lines 100 may be set to overlap with the data reset process of one or more other data lines 100, which can be set by a person skilled in the art according to actual needs, and the embodiment of the present disclosure is not limited in this regard.

According to the display panel provided in the embodiment of the present disclosure, the at least one data line is set to receive the data signal, while at least one of the multiple data lines except the at least one data line receiving the data signal is set to receive the reset signal simultaneously, i.e., the data reset process of at least one data line may overlap with the data writing process of the other data lines, and thus the data reset process of the data lines does not occupy the data writing time, and the charging time of sub-pixels can be extended and the display effect of the display panel can be improved.

Figure 2:
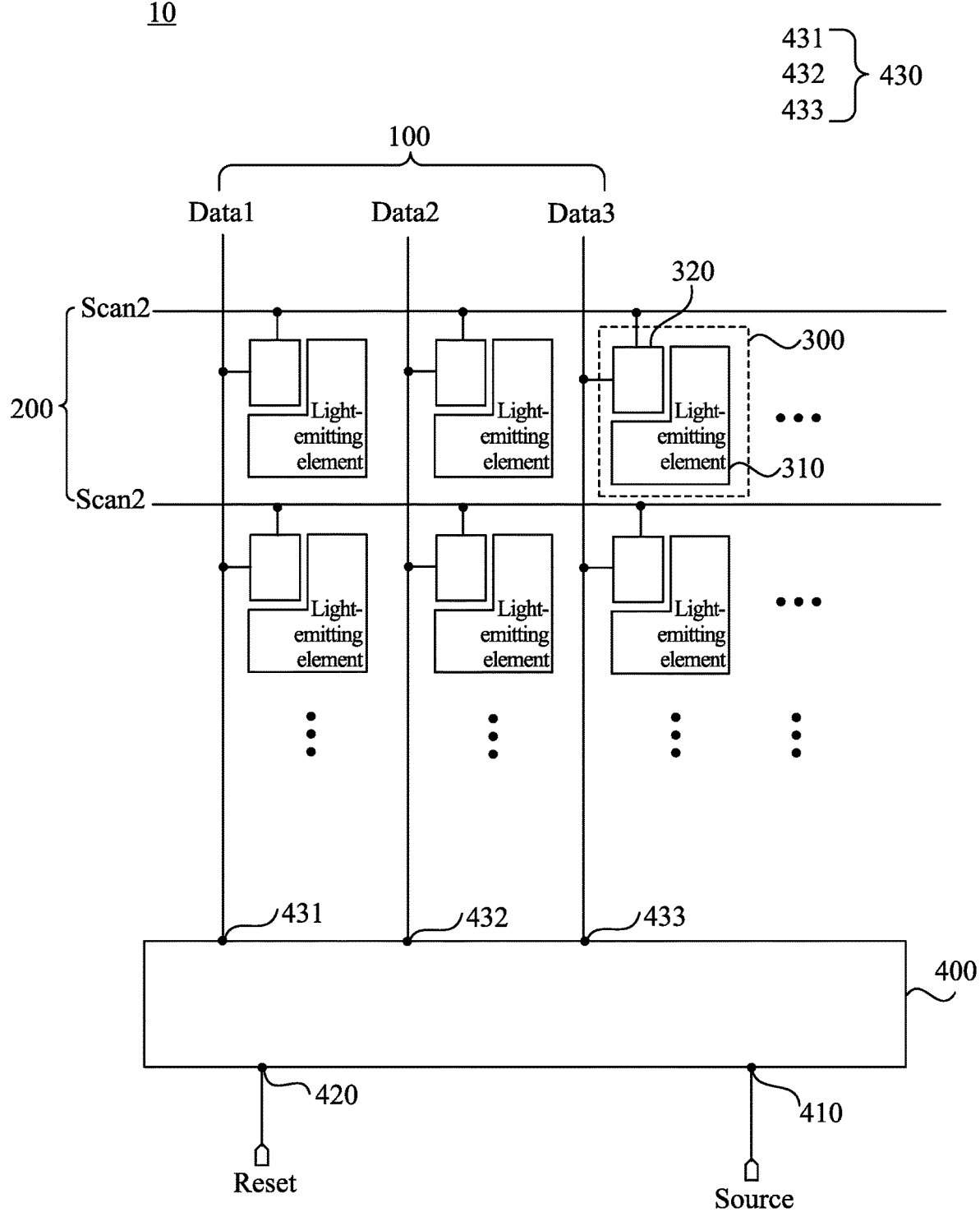
FIG. 2 is a structure diagram of another display panel according to an embodiment of the present disclosure.

FIG. 2 is a structure diagram of another display panel according to an embodiment of the present disclosure. Referring to FIG. 2, in an embodiment, the display panel 10 may further include a multi-path selection circuit 400, where the multi-path selection circuit 400 includes a first input 410, a second input 420 and N outputs 430, and the first input 410 receives the data signal, the second input 420 receives the reset signal, and the N outputs 430 are electrically connected to N data lines 100, respectively; and the N data lines 100 form a data line group. N is an integer greater than or equal to 3. The multi-path selection circuit 400 is configured to control the first input 410 and the N outputs 430 to be in signal communication in a time-division manner; and at least one of the data lines 100 in the data line group meets the following condition: the at least one data line 100 in the data line group receives the data signal, while the second input 420 is in signal communication with at least one of the N outputs 430 except an output 430 being in signal communication with the at least one data line 100 simultaneously.

FIG. 2 illustrates a connection between a multi-path selection circuit and the corresponding data line group. The multi-path selection circuit 400 is electrically connected to the N data lines 100, respectively, and transmits the data signals and the reset signal to different data lines 100 in a time-division manner. The multi-path selection circuit 400 corresponds to the N data lines 100, and the multi-path selection circuit 400 is provided with the N outputs 430 correspondingly, and one data line 100 is electrically connected to one output 430, i.e., the N outputs 430 are electrically connected to the N data lines 100, respectively. The multi-path selection circuit 400 is also provided with the first input 410 and the second input 420, where the first input 410 receives the data signal and the second input 420 receives the reset signal. The multi-path selection circuit 400 may control the first input 410 to be in signal communication with the N outputs 430 in the time-division manner, and thus transmits the data signals to data lines 100 are connected to the outputs 430 correspondingly through the outputs 430, and data writing is performed on different data lines 100 in the time-division manner. The multi-path selection circuit 400 may also control the second input 420 to be in signal communication with one or more outputs 430 of the N outputs 430, and thus transmits the reset signal to the correspondingly-connected data lines 100 through the outputs 430, to reset the potential.

At least one data line 100 in the data line group formed by the N data lines 100 meets the following condition that the at least one data line 100 receives the data signal, meanwhile, the second input 420 is in signal communication with at least one of the other output 430, it can be understood that in the data lines 100, the data writing process of one data line 100 may be set to overlap with the data reset process of one or more another data line 100, or the data writing process of any one data line 100 of multiple or even all data lines 100 may be set to overlap with the data reset process of one or more another data line 100, without limitation. Exemplarily, referring to FIG. 2, if the display panel 10 includes a $1^{st}$ data line Data1, a $2^{nd}$ data line Data2, and a $3^{rd}$ data line Data3 which are arranged sequentially along the row direction, the multi-path selection circuit 400 is accordingly provided with a first output 431, a second output 432, and a third output 433.

When the multi-path selection circuit 400 controls the first input 410 to be in signal communication with the first output 431, the data signal is transmitted to the $1^{st}$ data line Data1 electrically connected to the first output 431, to write data into the $1^{st}$ data line Data1; at the same time, the multi-path selection circuit 400 may control the second input 420 to be in signal communication with the third output 433, the reset signal is transmitted to the $3^{rd}$ data line Data3 electrically connected to the third output 433, and thus the potential of the $3^{rd}$ data line Data3 is reset. Before the $3^{rd}$ data line Data3 receives the data signal again next time, an additional reset process is needless, and the sub-pixels 300 can be charged by means of directly receiving the data signal without the occupation of charging time. In the embodiment, the data reset process of at least one data line 100 in the data line group is set to overlap with the data writing process of the other data lines 100 without the occupation of charging time, and the charging time of sub-pixels can be extended and the display effect of the display panel can be improved.

Figure 3:
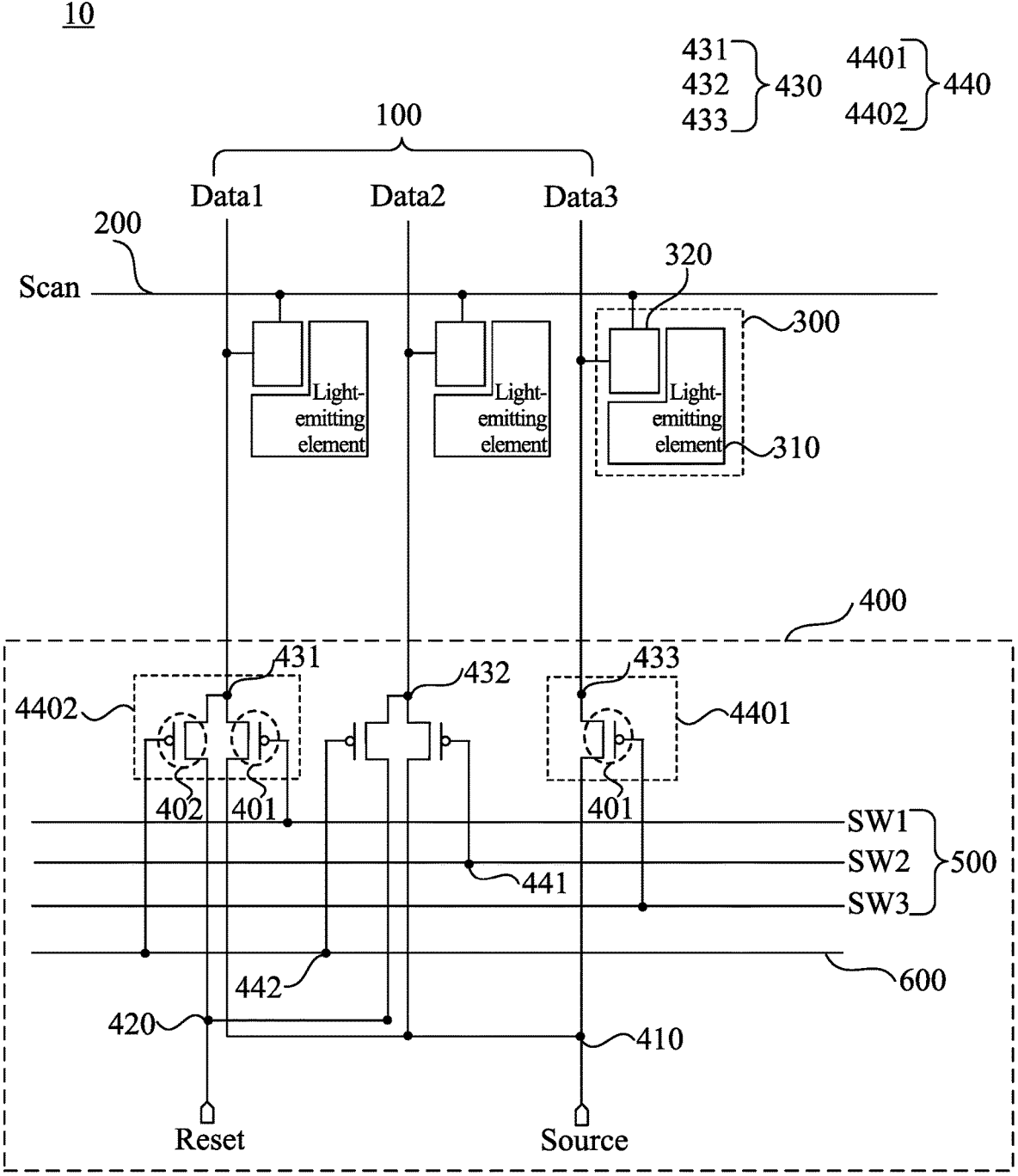
FIG. 3 is a structure diagram of another display panel according to an embodiment of the present disclosure.

FIG. 3 is a structure diagram of another display panel according to an embodiment of the present disclosure. Referring to FIG. 3, on the basis of the above embodiments, in an embodiment, the multi-path selection circuit 400 may include N switch devices 440, the N switch devices 440 are $1^{st}$ through $N^{th}$ switch devices 440, and an output 430 of an $i^{th}$ switch device is electrically connected to an $i^{th}$ data line 100 in the data line group correspondingly, and $1 \leq i \leq N$. The N switch devices 440 include first-type switch devices 4401 and second-type devices 4402, each first-type switch device 4401 includes a first input 410 and a first control terminal 441, and each second-type switch device 4402 includes a first input 410, a first control terminal 441, a second input 420 and a second control terminal 442. The first control terminal 441 of the first-type switch device 4401 is configured to control the first input 410 of the first-type switch device 4401 to be in signal communication with an output 430 of the first-type switch device 4401 or to be not in signal communication with an output 430 of the first-type switch device 4401, the first control terminal 441 of the second-type switch device 4402 is configured to control the first input 410 of the second-type switch device 4402 to be in signal communication with an output 430 of the second-type switch device 4402 or to be not in signal communication with an output 430 of the second-type switch device 4402, and the second control terminal 442 of the second-type switch device 4402 is configured to control the second input 420 of the second-type switch device 4402 to be in signal communication with the output 430 of the second-type switch device 4402 or to be not in signal communication with the output 430 of the second-type switch device 4402.

Exemplarily, referring to FIG. 3, the multi-path selection circuit 400 is provided with N switch devices 440, the N switch devices 440 include first-type switch devices 4401 and second-type switch devices 4402, and each of the first-type switch devices 4401 and the second-type switch devices 4402 includes a first input 410, an output 430 and a first control terminal 441. The difference between the first-type switch devices 4401 and the second-type switch devices 4402 is that each second-type switch device 4402 further includes a second input 420 and a second control terminal 442. The first input 410 of each of the N switch devices 440 (including the first-type switch devices 4401 and the second-type switch devices 4402) may receive the data signal, and one switch device 440 is, through its output 430, connected to respective one data line 100, and thus the multi-path selection circuit 400 may control, based on the first control terminal 441 of the switch device 440, the first input 410 of the switch device 440 to be or to be not in signal communication with the output 430 of the switch device 44, that is, the multi-path selection circuit 400 controls, through the first control terminal 441 of the first-type switch device 4401, the first input 410 of the first-type switch device 4401 to be or to be not in signal communication with the output 430 of the first-type switch device 4401, while the multi-path selection circuit 400 controls, through the first control terminal 441 of the second-type switch device 4402, the first input 410 of the second-type switch device 4402 to be or to be not in signal communication with the output 430 of the second-type switch device 4402. When the first input 410 of the first-type switch device 4401 is in signal communication with the output 430 of the first-type switch device 4401, the data signal is written into the data line 100 electrically connected to the first-type switch device 4401 for data writing; and when the first input 410 of the second-type switch device 4402 is in signal communication with the output 430 of the second-type switch device 4402, the data signal is written into the data line 100 electrically connected to the second-type switch device 4402 for data writing.

The second input 420 of the second-type switch device 4402 may receive the reset signal, and the multi-path selection circuit 400 may control, based on the second control terminal 442 of the second-type switch device 4402, the second input 420 of the second-type switch device 4402 to be or to be not in signal communication with the output 430 of the second-type switch device 4402. When the second input 420 of the second-type switch device 4402 is in signal communication with the output 430 of the second-type switch device 4402, the reset signal is written into a data line 100 electrically connected to the second-type switch device 4402, and thus the potential is reset. The multi-path selection circuit 400 can achieve the data writing and reset of the data line 100 and the data reset process of at least one data line 100 in the data line group overlaps the data writing process of the other data lines 100, and the charging time is prolonged.

Referring to FIG. 3, in an embodiment, the multi-path selection circuit 400 may include N switch devices 440, the N switch devices 440 are $1^{st}$ through $N^{th}$ switch devices 440, and an output 430 of an $i^{th}$ switch device is electrically connected to an $i^{th}$ data line 100 in the data line group correspondingly, and $1 \leq i \leq N$. Each switch device 440 includes a first input 410 and a first control terminal 441, and the first control terminal 441 of the switch device 440 is configured to control the first input 410 of the switch device 440 to be in signal communication with the output 430 of the switch device 440 or to be not in signal communication with the output 430 of the switch device 440. The display panel 10 may further include $1^{st}$ through $N^{th}$ charge control lines 500, where an $i^{th}$ charge control line 500 is electrically connected to the first control terminal 441 of an $i^{th}$ switch device 440 and is configured to control the first input 410 of the $i^{th}$ switch device 440 to be in signal communication with an output 430 of the $i^{th}$ switch device 440 or to be not in signal communication with an output 430 of the $i^{th}$ switch device 440.

In an embodiment, each switch device 440 includes the first input 410, the output 430 and the first control terminal 441. The display panel 10 is further provided with N charge control lines 500 corresponding to N switch devices 440, and one charge control line 500 is electrically connected to the first control terminal 441 of one respective switch device 440. The display panel 10 controls the first inputs 410 of multiple switch devices 440 to be or to be not in signal communication with the outputs 430 of the multiple switch devices 440 at the same time by controlling the charge control lines 500 electrically connected to the multiple switch devices 440, and the data signal received by the first inputs 410 is written into the corresponding sub-pixels 300 when the first inputs 410 and the outputs 430 are in signal communication.

Figure 4:
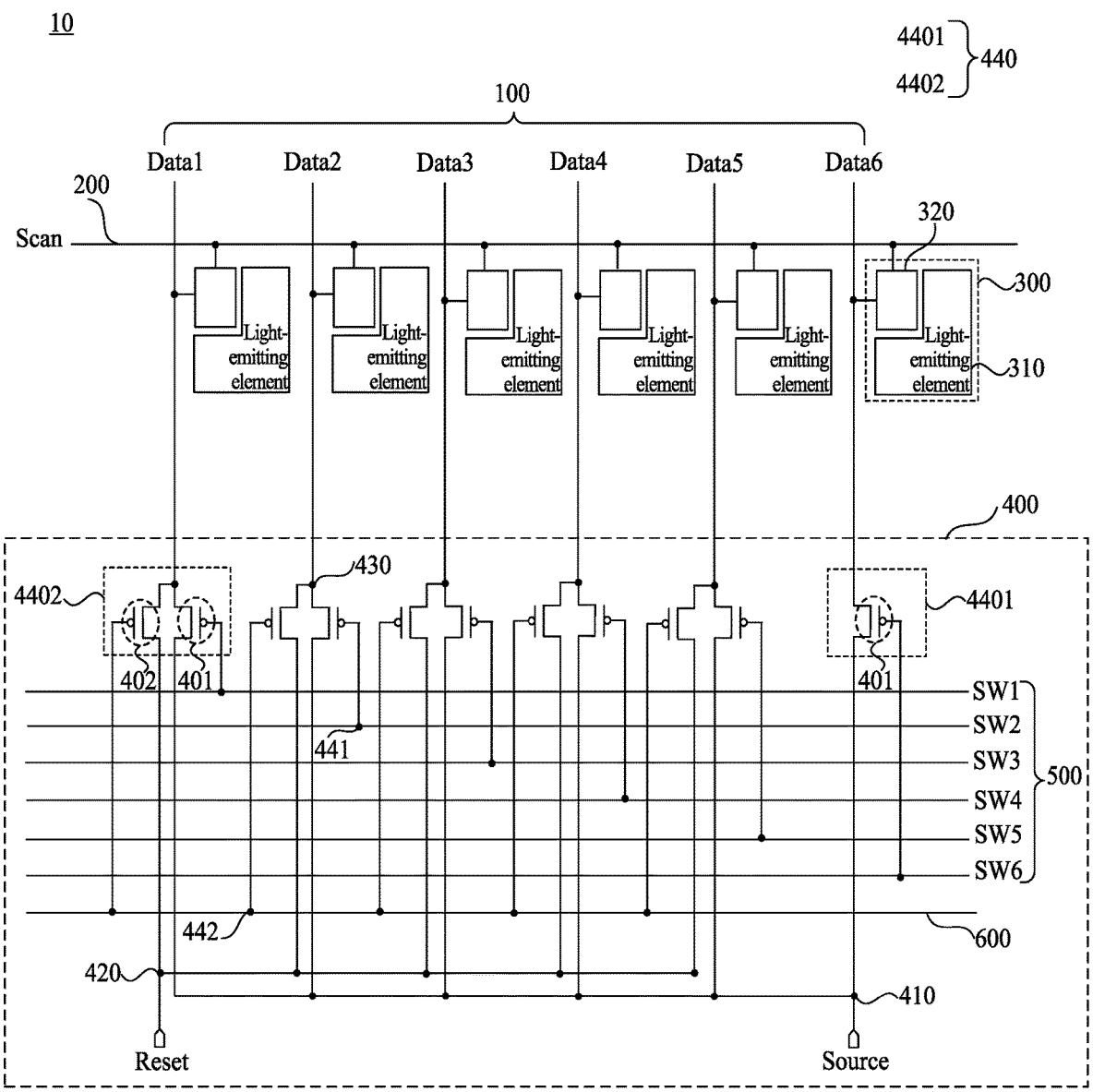
FIG. 4 is a structure diagram of another display panel according to an embodiment of the present disclosure.

FIG. 4 is a structure diagram of another display panel according to an embodiment of the present disclosure. Referring to FIGS. 3 and 4, in an embodiment, the number of the second-type switch devices 4402 among the N switch devices 440 may be M, and M is less than N. The display panel 10 further includes at least one reset control line 600, the at least reset control line 600 is electrically connected to second control terminals 442 of the second-type switch devices 4402, and the at least reset control line 600 is configured to control second inputs 420 of the second-type switch devices 4402 to be or to be not in signal communication with outputs 430 of the second-type switch devices 4402 at the same time.

Exemplarily, referring to FIGS. 3 and 4, only part of switch devices 440 (i.e., the second-type switch devices 4402) among the N switch devices 440 are provided with the second input 420 and the second control terminal 442, and the display panel 10 is provided with one reset control line 600, and the reset control line 600 is electrically connected to second control terminals 442 of the second-type switch devices 4402. The display panel 10 controls, by means of controlling the reset control line 600 electrically connected to the second-type switch devices 4402, the second input 420 of the second-type switch device 4402 to be or to be not in signal communication with the output 430 of the second-type switch device 4402, and the reset signal received by the second input 420 is written into a corresponding data line 100 when the second input 420 is in signal communication with the output 430, to realize potential reset. Setting the one reset control line 600 not only can simplify the line layout, but also allows the data reset process of at least one data line 100 in the data line group to overlap with the data writing process of the other data lines 100, which can prolong the charging time.

It should be noted that the above description merely takes the multi-path selection circuit 400 including one reset control line 600 as an example, which is not a limitation. Those skilled in the art may set the number of reset control lines 600 and the manner of connection between the reset control line 600 and the second control terminal 442 of the second-type switch device 4402 according to actual situations, which is not limited in the embodiments of the present disclosure. In addition, the examples of setting N=3 in FIG. 3 and setting N=6 in FIG. 4 are based on the case where a single pixel is composed of three sub-pixels of red, green and blue, and the cases of N=3 and N=6 are respectively one and two times of the number of the sub-pixels. For the pixel situation where a single pixel is composed of two sub-pixels in the pixel arrangement, the corresponding value of N may be one of 4, 6, 8, . . . . To sum up, the value of N may be any multiple of 2 or 3, and N>3.

Figure 5:
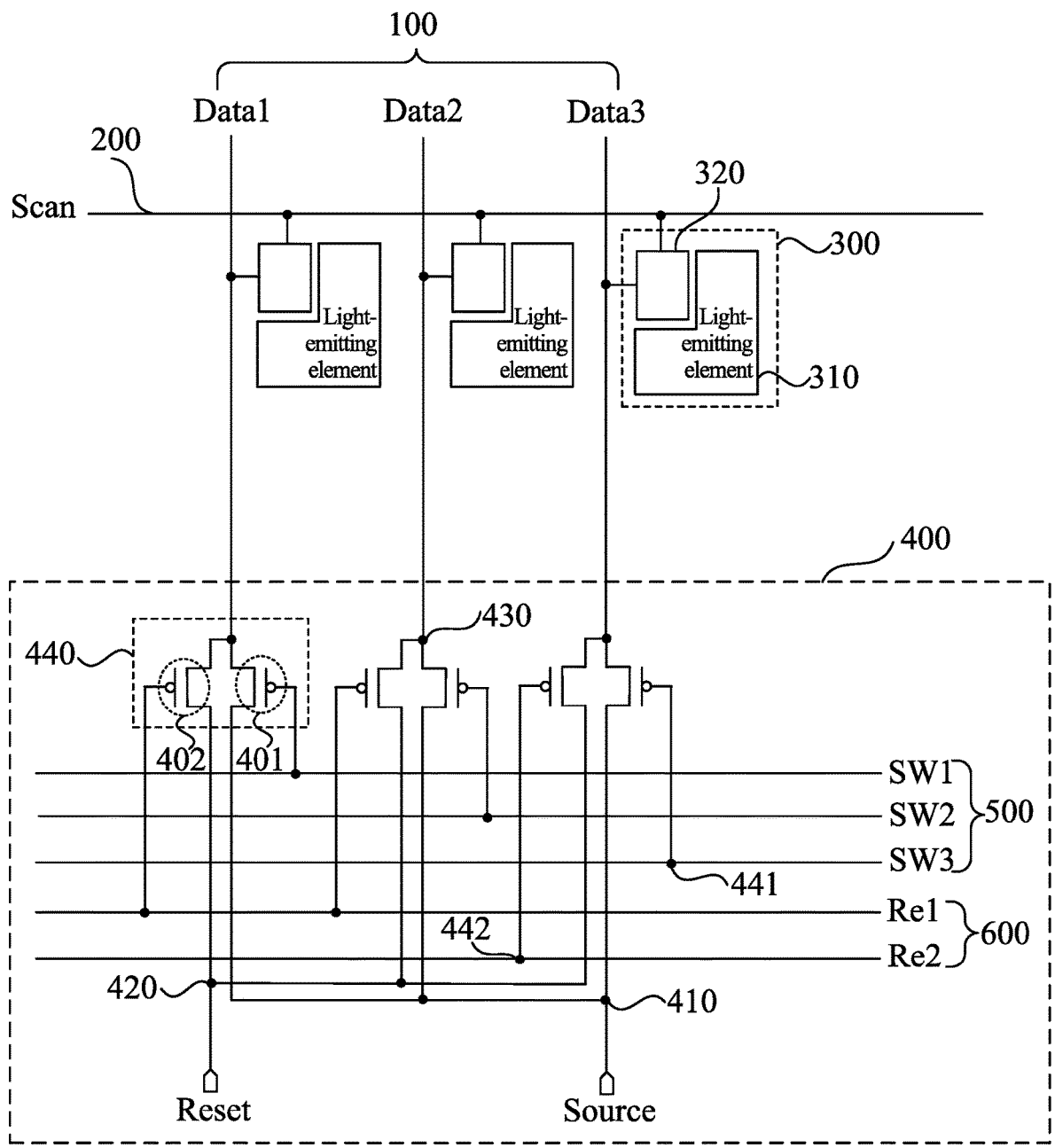
FIG. 5 is a structure diagram of another display panel according to an embodiment of the present disclosure.
Figure 6:
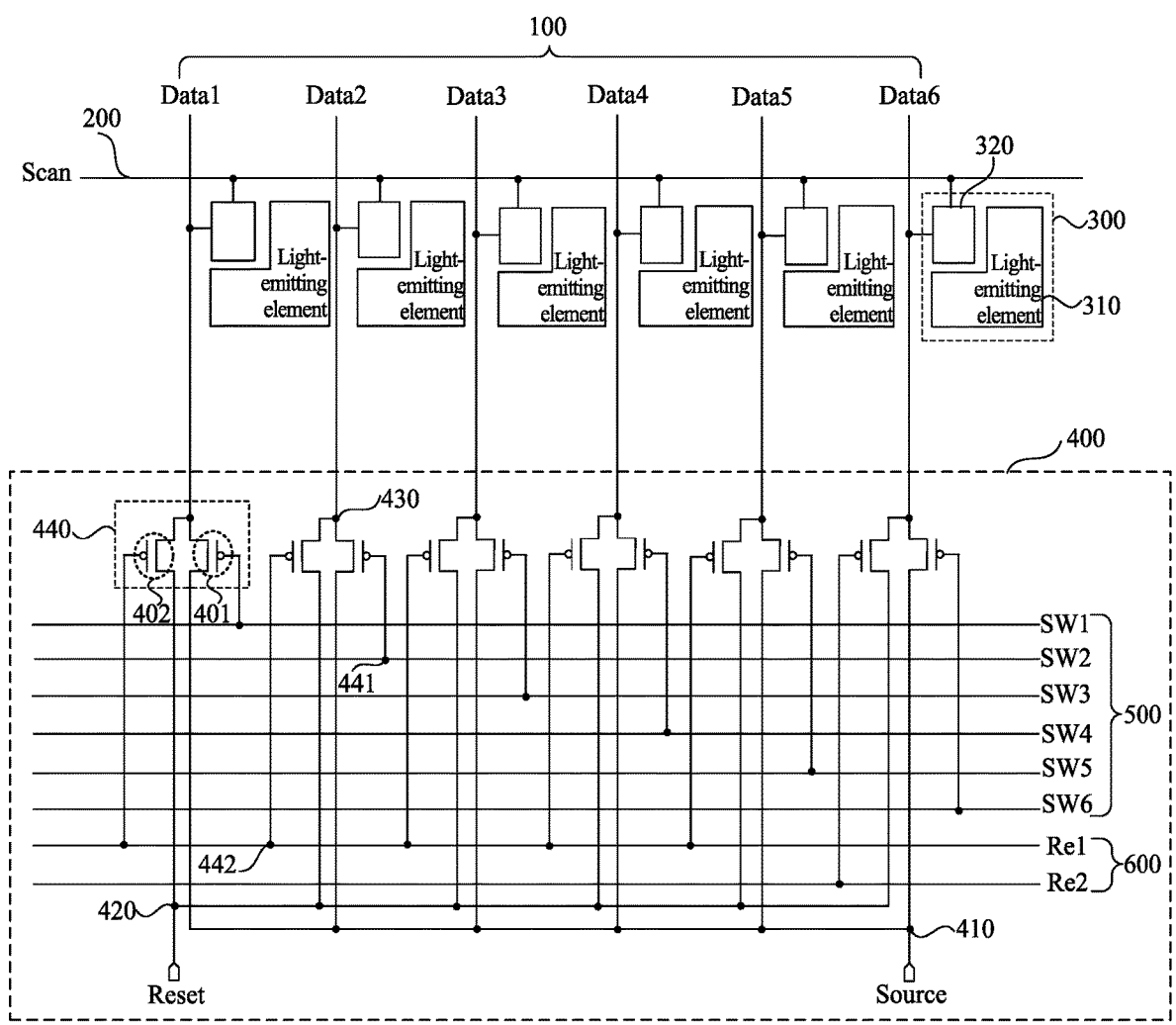
FIG. 6 is a structure diagram of another display panel according to an embodiment of the present disclosure.

FIG. 5 is a structure diagram of another display panel according to an embodiment of the present disclosure. FIG. 6 is a structure diagram of another display panel according to an embodiment of the present disclosure. Referring to FIGS. 5 and 6, in an embodiment, each of the N switch devices 440 may further include a second input 420 and a second control terminal 442, and the second control terminal 442 of the switch device 440 is configured to control the second input 420 of the switch device 440 to be or to be not in signal communication with the output 430 of the switch device 440. The display panel 10 further includes at least two reset control lines 600; where each reset control line 600 is electrically connected to the second control terminal 442 of at least one switch device 440, and the at least two reset control lines 600 are configured to control second inputs 420 of the switch devices 440 to be or to be not in signal communication with outputs 430 of the switch devices 440 at the same time.

Among the N switch devices 440, part or all of the switch devices 440 each may include the second input 420 and the second control terminal 442, and the display panel 10 may be provided with two or more reset control lines 600. Exemplarily, referring to FIGS. 5 and 6, the case in which each switch device 440 is provided with the second input 420 and the second control terminal 442 and the display panel 10 includes two reset control lines 600 (a $1^{st}$ reset control line Re1 and a $2^{nd}$ reset control line Re2) is taken as an example, and the $2^{nd}$ reset control line Re2 may be set to be electrically connected to the second control terminal 442 of the switch device 440 electrically connected to an $N^{th}$ data line DataN (N=3 in FIG. 5, N=6 in FIG. 6), and the $1^{st}$ reset control line Re1 may be set to be electrically connected to the second control terminals 442 of switch devices 440 electrically connected to the other data lines 100 (the $1^{st}$ to $(N-1)^{th}$ data lines). In this way, by means of the $1^{st}$ reset control line Re1 electrically connected to the $1^{st}$ to $(N-1)^{th}$ data lines, the display panel 10 controls the second inputs 420 of the switch devices 440 electrically connected to the $1^{st}$ to $(N-1)^{th}$ data lines to be or to be not in signal communication with outputs 430 of the switch devices 440 electrically connected to the $1^{st}$ to $(N-1)^{th}$ data lines at the same time, and when the second inputs 420 are in signal communication with the outputs 430, the reset signal received by the second inputs 420 is transmitted to the corresponding data lines 100 to reset the potential of the $1^{st}$ to $(N-1)^{th}$ data lines. The display panel 10 controls, by means of the $2^{nd}$ reset control line Re2 electrically connected to the $N^{th}$ data line, the second input 420 of the switch device 440 electrically connected to the $N^{th}$ data line DataN to be or to be not in signal communication with an output 430 of the switch device 440 electrically connected to the $N^{th}$ data line DataN, and when the second input 420 is in signal communication with the output 430, the reset signal received by the second input 420 is transmitted to the $N^{th}$ data line DataN to reset the potential of the $N^{th}$ data line DataN. Thus, in the data writing phase of the $N^{th}$ data line DataN, the potential of the $1^{st}$ to $(N-1)^{th}$ data lines is reset, and in the data writing phase of any one of the $1^{st}$ to $(N-1)^{th}$ data lines 100, the potential of the $N^{th}$ data line is reset, i.e., by setting the two reset control lines 600, the data reset process of any one data line 100 in the data line group can overlap with the data writing process of the other data lines 100, and thus the charging time is further extended.

Figure 7:
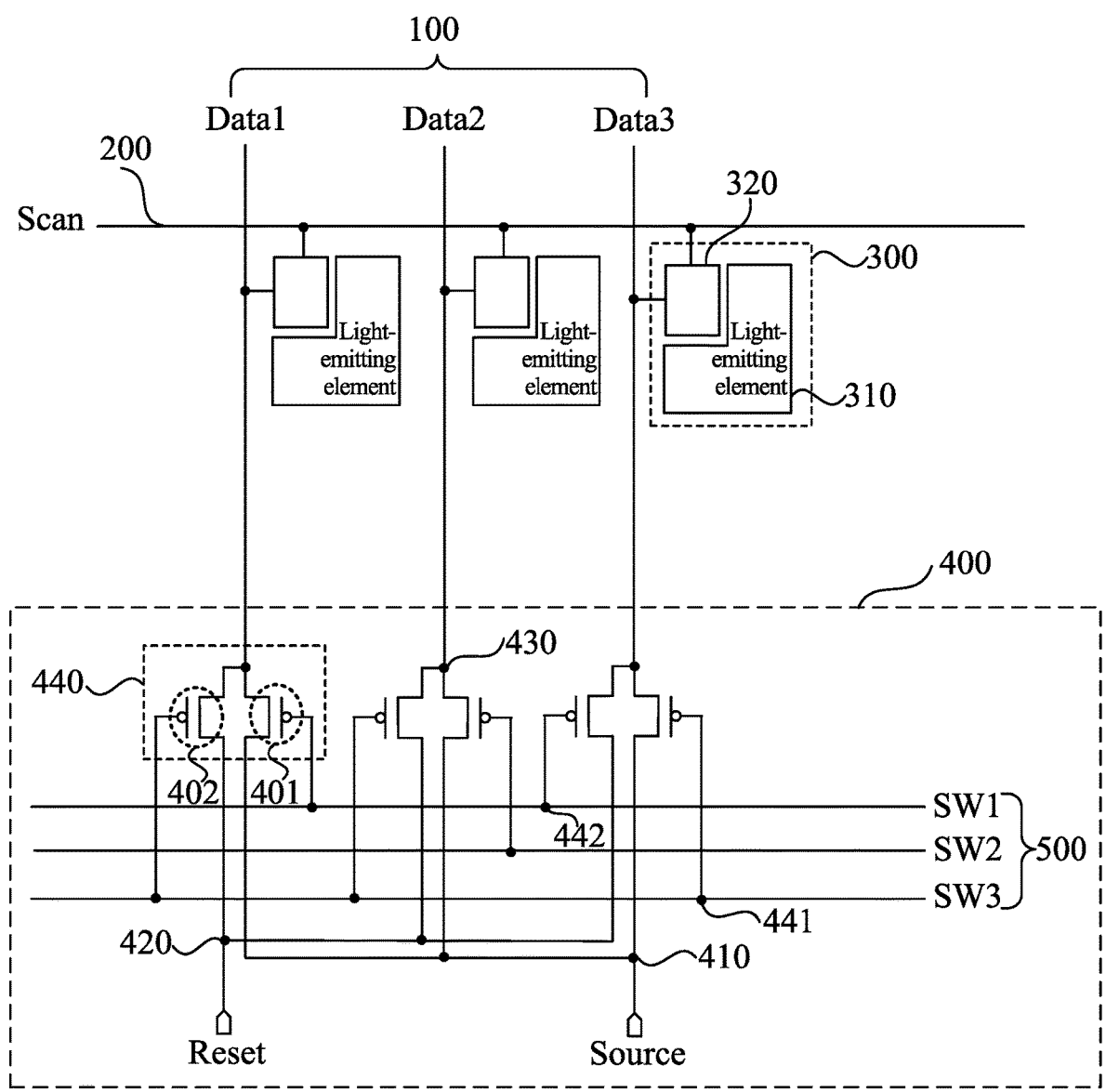
FIG. 7 is a structure diagram of another display panel according to an embodiment of the present disclosure.

It should be noted that the connection between the second control terminals 442 of all the switch devices 440 and the reset control lines 600 shown in FIGS. 5 and 6 is only an example, not a limitation, and those skilled in the art can arrange the connection of each reset control line 600 and the second control terminal 442 of each switch device 440 according to an actual situation. FIG. 7 is a structure diagram of another display panel according to an embodiment of the present disclosure. Referring to FIG. 7, in an embodiment, each of the N switch devices 440 further includes a second input 420 and a second control terminal 442, and the second control terminal 442 of the switch device 440 is configured to control the second input 420 of the switch device 440 to be or to be not in signal communication with the output 430 of the switch device 440; at least one charge control line 500 is also used as the reset control line and is electrically connected to the first control terminal 441 of an $i^{th}$ switch device 440 and the second control terminal 442 of a $j^{th}$ switch device 440 respectively, and the at least one charge control line 500 is configured to control the first input 410 of the $i^{th}$ switch device 440 to be in signal communication with an output 430 of the $i^{th}$ switch device 440, and simultaneously control the second input 420 of the $j^{th}$ switch device 440 to be in signal communication with an output 430 of the $j^{th}$ switch device 440, and i≠j.

In an embodiment, each switch device 440 is further provided with the second input 420 and the second control terminal 442, the charge control line 500 may also be used as the reset control line, and the charge control line 500 used as the reset control line is electrically connected to second control terminals 442 of respective switch devices 440. The display panel 10 controls, by means of resetting the reset control line 600 electrically connected to a switch device 440, the second input 420 of the switch device 440 to be or to be not in signal communication with the output 430 of the switch device 440, and the reset signal received by the second input 420 is written into a corresponding data line 100 when the second input 420 is in signal communication with the output 430, to realize potential reset.

Exemplarily, referring to FIG. 7, the $1^{st}$ charge control line SW1 and the $3^{rd}$ charge control line SW3 in the charge control lines 500 are also used as the reset control lines. The $1^{st}$ charge control line SW1 is electrically connected to the first control terminal 441 of the first switch device 440 corresponding to the $1^{st}$ data line Data1 and the second control terminal 442 of the third switch device 440 corresponding to the $3^{rd}$ data line Data3, respectively. The display panel 10 controls the first input 410 of the first switch device 440 to be in signal communication with the output 430 of the first switch device 440 electrically connected to the $1^{st}$ data line Data1, and also controls the second input 420 of the third switch device 440 to be in signal communication with the output 430 of the third switch device 440 electrically connected to the $3^{rd}$ data line Data3 simultaneously, and the potential of the $3^{rd}$ data line Data3 is reset during the data writing phase of the $1^{st}$ data line Data1.

The $3^{rd}$ charge control line SW3 is electrically connected to the first control terminal 441 of the third switch device 440 corresponding to the $3^{rd}$ data line Data3, the second control terminal 442 of the first switch device 440 corresponding to the $1^{st}$ data line Data1 and the second control terminal 442 of the second switch device 440 corresponding to the $2^{nd}$ data line Data2, respectively. The display panel 10 controls the first input 410 of the third switch device 440 to be in signal communication with the output 430 of the third switch device 440 electrically connected to the $3^{rd}$ data line Data3, controls the second input 420 of the first switch device 440 to be in signal communication with the output 430 of the first switch device 440 electrically connected to the $1^{st}$ data line Data1 simultaneously, and further controls the second input 420 of the second switch device 440 to be in signal communication with the output 430 of the second switch device 440 electrically connected to the $2^{nd}$ data line Data2 simultaneously, and the potential of the $1^{st}$ data line Data1 and the $2^{nd}$ data line Data2 is reset during the data writing phase of the $3^{rd}$ data line Data3.

In the embodiment of the present disclosure, the charge control line 500 is also used as the reset control line, and thus the data reset process of each data line 100 not only can overlap with the data writing phase of the other data lines 100 to prolong the charging time, but also no additional reset control line is required, which is beneficial to achieve a narrow bezel.

Referring to FIG. 7, based on the above embodiments, in an embodiment, the switch devices 440 may include a first switch 401 and a second switch 402; an input of the first switch 401 receives the data signal, and a control terminal of the first switch 401 is electrically connected to one of the charge control lines 500; an input of the second switch 402 receives the reset signal, and a control terminal of the second switch 502 is electrically connected to the reset control line 600; an output of the first switch 401 and an output of the second switch 402 are electrically connected to the same data line 100; and the charge control lines 500 and the reset control line 600 are configured to control the first switch 401 and the second switch 402 in the switch device 440 to be turned on in the time-division manner.

In the embodiment, each switch device 440 includes the first switch 401 and the second switch 402, and the charge control lines 500 control the first switch 401 to be turned on or off, and when being on, the first switch 401 transmits the data signal received by the input of the first switch 401 to the data line 100 electrically connected to the first switch 401, to achieve the data writing. The reset control line 600 controls the second switch 402 to be turned on or off, and when being on, the second switch 402 transmits the reset signal received by the input of the second switch 402 to the data line 100 electrically connected to the second switch 402, to realize the potential reset. The second switch 402 for controlling the data reset process of the data line 100 and the first switch 401 for controlling the data writing process of the data line 100 are provided, and the second switch 402 and the first switch 401 may be connected to the charge control lines 500 with misalignment and the data writing process and the reset process of data lines 100 are performed synchronously, it is needless to set aside extra reset time or pixel charging time of data lines 100, and thus the effective charging time is prolonged.

In an embodiment, the first switch 401 and the second switch 402 may be P-type transistors.

In the embodiment, the first switch 401 and the second switch 402 may be both P-type transistors, and the P-type transistors have the advantages of high switching speed, high carrier mobility, low power consumption, and a relatively simple preparation process. In other embodiments, the first switch 401 and the second switch 402 may also be N-type transistors. Although the preparation process of N-type transistors is relatively complex, the carrier mobility is relatively high.

Referring to FIG. 6, in an embodiment, the multi-path selection circuit 400 may be configured to sequentially provide the data signal for $1^{st}$ through $N^{th}$ data lines 100 in the data line group; and during the data writing phase of one of $3^{rd}$ data line Data3 to the $N^{th}$ data line DataN, the $1^{st}$ data line Data1 receives the reset signal.

The multi-path selection circuit 400 provides the data signal for the $1^{st}$ through $N^{th}$ data lines 100 in the data line group in the order of the $1^{st}$ to $N^{th}$ data line 100. In this process, the process of writing the data of the $1^{st}$ data line Data1 into a pixel storage capacitor and the data writing process of the $2^{nd}$ data line Data2 are carried out at the same time, and during the data writing process of the 2nd data line Data2, the $1^{st}$ data line Data1 cannot be reset. Therefore, the data reset process of the $1^{st}$ data line Data1 may overlap with the data writing phase of any other data lines 100 except the $2^{nd}$ data line Data2, i.e., the $3^{rd}$ data line Data3 to the $N^{th}$ data line DataN, and thus the charging time is prolonged.

Referring to FIG. 6, in an embodiment, the multi-path selection circuit 400 may be configured to sequentially provide the data signal for the $1^{st}$ through $N^{th}$ data lines 100 in the data line group; the operation of the data lines 100 further includes a data reset phase; and the data reset phase of a $p^{th}$ data line 100 overlaps with the data writing phase of a $q^{th}$ data line 100, $2 \leq p \leq N-1$, $1 \leq q \leq N$, and $p \neq q$.

The multi-path selection circuit 400 provides the data signal for the $1^{st}$ through $N^{th}$ data lines 100 in the data line group in the order of the $1^{st}$ to $N^{th}$ data line 100. In this process, the data reset process of any one data line 100 of the $2^{nd}$ data line to $(N-1)^{th}$ data line can overlap with the data writing phase of any other data line 100 from the $1^{st}$ data line to the $N^{th}$ data line except the any one data line 100 itself, to prolong the charging time.

Exemplarily, if N=6, the data reset process of any one data line 100 from the $2^{nd}$ data line to the $5^{th}$ data line may overlap with the data writing process of any other data line 100 from the $1^{st}$ data line to the $6^{th}$ data line except the one from the $2^{nd}$ data line to the $5^{th}$ data line. For example, the data reset process of the $3^{rd}$ data line may overlap with the data writing process of any one data line 100 among the $1^{st}$ data line, the $2^{nd}$ data line, and the $4^{th}$ data line to the $6^{th}$ data line.

Referring to FIG. 6, in an embodiment, the multi-path selection circuit 400 may be configured to sequentially provide the data signal for $1^{st}$ through $N^{th}$ data lines 100 in the data line group; and during the data writing phase of the $1^{st}$ data line Data1, the $N^{th}$ data line DataN receives the reset signal.

The multi-path selection circuit 400 provides the data signal for the $1^{st}$ through $N^{th}$ data lines 100 in the data line group in the order of the $1^{st}$ to $N^{th}$ data line 100. In this process, since the $N^{th}$ data line DataN is the last data line 100, after the data signal is written to the $N^{th}$ data line DataN in the previous row, the data writing process of the next row starts from the $1^{st}$ data line Data1 again. So, the data reset process of the $N^{th}$ data line DataN needs to overlap with the data writing process of the $1^{st}$ data line Data1.

The working process of the data writing phase and the reset phase of each data line 100 in the display panel 10 is described below with embodiments. The switch devices 440 are all P-type transistors.

Figure 8:
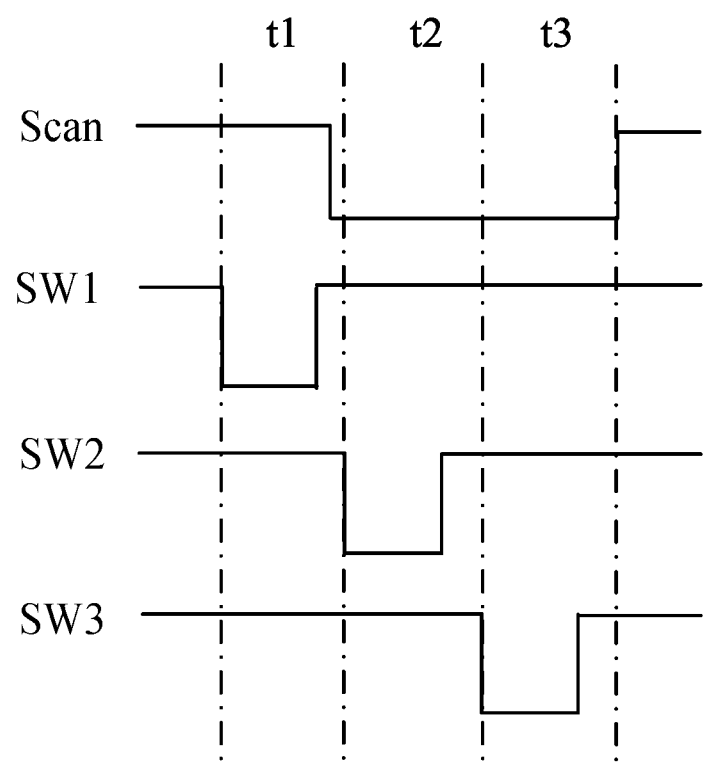
FIG. 8 is a drive timing diagram corresponding to the display panel provided in FIG. 7.

FIG. 8 is a drive timing diagram corresponding to the display panel provided in FIG. 7. Referring to FIGS. 7 and 8, in an embodiment, N=3; the $1^{st}$ charge control line SW1 is electrically connected to the first control terminal 441 of the $1^{st}$ switch device 440 and the second control terminal 442 of the $3^{rd}$ switch device 440, respectively; the $2^{nd}$ charge control line SW2 is electrically connected to the first control terminal 441 of the $2^{nd}$ switch device 440; and the $3^{rd}$ charge control line SW3 is electrically connected to the first control terminal 441 of the $3^{rd}$ switch device 440, the second control terminal 442 of the $1^{st}$ switch device 440 and the second control terminal 442 of the $2^{nd}$ switch device 440, respectively.

Exemplarily, referring to FIGS. 7 and 8, in the embodiment, the display panel 10 includes three data lines 100, which are the $1^{st}$ data line Data1, the $2^{nd}$ data line Data2, and the $3^{rd}$ data line Data3, respectively, the multi-path selection circuit 400 is provided with three switch devices 440 correspondingly, and the display panel 10 is further provided with three charge control lines 500, which are respectively the $1^{st}$ charge control line SW1, the $2^{nd}$ charge control line SW2 and the $3^{rd}$ charge control line SW3. The $1^{st}$ charge control line SW1 is electrically connected to the first control terminal 441 of the first switch device 440. The $1^{st}$ charge control line SW1, by controlling the first switch device 440 to be turned on or off, allows the first input 410 of the first switch device 440 to receive the data signal when the first switch device 440 is turned on, and allows the $1^{st}$ data line Data1 to convey the data signal to perform data writing. The $2^{nd}$ charge control line SW2 is electrically connected to the first control terminal 441 of the second switch device 440, and by controlling the second switch device 440 to be turned on or off, the $2^{nd}$ charge control line SW2 allows the first input 410 of the second switch device 440 to receive the data signal when the second switch device 440 is turned on, and transmits the data signal for the $2^{nd}$ data line Data2 to perform data writing. The $3^{rd}$ charge control line SW3 is electrically connected to the first control terminal 441 of the third switch device 440, and by controlling the third switch device 440 to be turned on or off, the $3^{rd}$ charge control line SW3 allows the first input 410 of the third switch device 440 to receive the data signal when the third switch device 440 is turned on, and transmits the data signal for the $3^{rd}$ data line Data3 to perform data writing.

In addition, the $1^{st}$ charge control line SW1 and the $3^{rd}$ charge control line SW3 in the charge control lines 500 are also used as the reset control lines. The $1^{st}$ charge control line SW1 is also electrically connected to the second control terminal 442 of the third switch device 440, and by controlling the third switch device 440 to be turned on or off, the $1^{st}$ charge control line SW1 transmits the reset signal for the $3^{rd}$ data line Data3 through the second input 420 of the third switch device 440 to achieve potential reset when the third switch device 440 is turned on. The 3rd charge control line SW3 is further electrically connected to the second control terminal 442 of the first switch device 440 and the second control terminal 442 of the second switch device 440, respectively, and by controlling the first switch device 440 and the second switch device 440 to be turned on or off, the first switch device 440 and the second switch device 440 are controlled to be turned on simultaneously, and the $3^{rd}$ charge control line SW3 transmits the reset signal for the 1st data line Data1 and the $2^{nd}$ data line Data2 through the second inputs 420 of the first switch device 440 and the second switch 440 respectively, to carry out potential reset.

With reference to the drive timing diagram shown in FIG. 8, the data writing process and the reset process of each data line 100 are described below.

Time period t1: the signal on the $1^{st}$ charge control line SW1 is the low level, the $1^{st}$ charge control line SW1 controls the first input 410 of the first switch device 440 to be in signal communication with the output 430 of the first switch device 440, the first input 410 of the first switch device 440 receives the data signal, and the data signal is written to the $1^{st}$ data line Data1 through the first switch device 440. At the same time, the $1^{st}$ charge control line SW1 controls the second input 420 of the third switch device 440 to be in signal communication with the output 430 of the third switch device 440, and the second input 420 of the third switch device 440 receives the reset signal, and the reset signal is written to the $3^{rd}$ data line Data3 through the third switch device 440 to reset the potential. At this time, the scan signal is the high level, and none of the sub-pixels is turned on, so data mischarging does not occur.

Time period t2: the signal on the $1^{st}$ charge control line SW1 is the high level, and the $1^{st}$ charge control line SW1 controls the first input 410 of the first switch device 440 to be not in signal communication with the output 430 of the first switch device 440; the scan signal is the low level, all the sub-pixels are turned on, and the data signal stored on the $1^{st}$ data line Data1 is written into sub-pixels electrically connected to the $1^{st}$ data line Data1. The signal on the $2^{nd}$ charge control line SW2 is the low level, and the $2^{nd}$ charge control line SW2 controls the first input 410 of the second switch device 440 to be in signal communication with the output 430 of the second switch device 440, the first input 410 of the second switch device 440 receives the data signal, and the data signal is written into the $2^{nd}$ data line Data2 through the second switch device 440, and at the same time, the data signal is also written into the sub-pixel electrically connected to the $2^{nd}$ data line Data2.

Time period t3: the signal on the $2^{nd}$ charge control line SW2 is the high level, and the $2^{nd}$ charge control line SW2 controls the first input 410 of the second switch device 440 to be not in signal communication with the output 430 of the second switch device 440. The scan signal is the low level, all the sub-pixels are still turned on, the signal on the $3^{rd}$ charge control line SW3 is the low level, and the $3^{rd}$ charge control line SW3 controls the first input 410 of the third switch device 440 to be in signal communication with the output 430 of the third switch device 440. The first input 410 of the third switch device 440 receives the data signal, the data signal is written into the $3^{rd}$ data line Data3 through the third switch device 440, and at the same time, the data signal is written into the sub-pixel electrically connected to the $3^{rd}$ data line Data3. Meanwhile, the $3^{rd}$ charge control line SW3 controls the second input 420 of the first switch device 440 to be in signal communication with the output 430 of the first switch device 440, and controls the second input 420 of the second switch device 440 to be in signal communication with the output 430 of the second switch device 440, and the second inputs 420 of the first switch device 440 and the second switch device 440 both receive the reset signal, and through the first switch device 440 and the second switch device 440, the reset signal is transmitted to the $1^{st}$ data line Data1 and the $2^{nd}$ data line Data2, respectively, to reset the potential. Due to the existence of an equivalent diode in the sub-pixel, the potential of the sub-pixel into which the data signal has been written and which is electrically connected to the $1^{st}$ data line Data1 is not reset.

In the end, since each data line 100 is reset during gating after the data writing, it can be completely avoided that subsequent data cannot be written due to data pre-writing. Moreover, the reset process of any of all data lines 100 in the data line group overlaps with the data writing process of the other data lines 100, and thus the charging time can be prolonged and the display effect can be improved.

Figure 9:
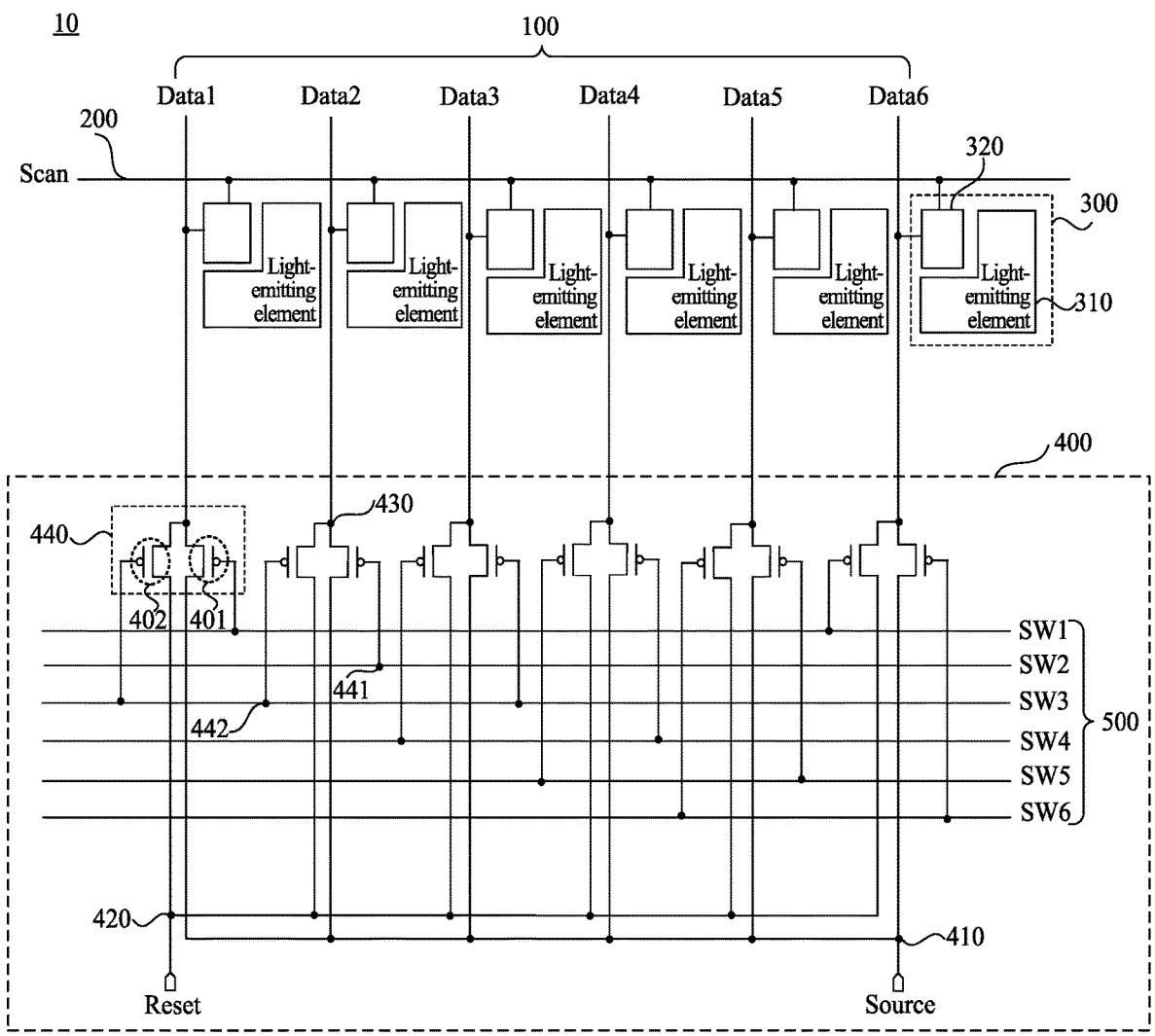
FIG. 9 is a structure diagram of another display panel according to an embodiment of the present disclosure.
Figure 10:
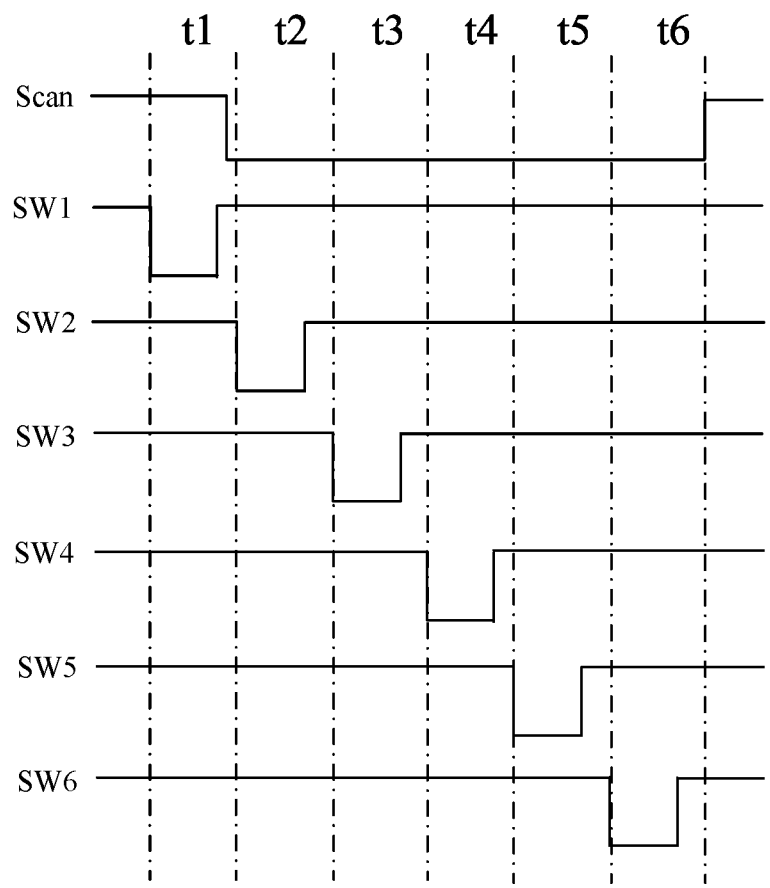
FIG. 10 is a drive timing diagram corresponding to the display panel provided in FIG. 9.

FIG. 9 is a structure diagram of another display panel according to an embodiment of the present disclosure, and FIG. 10 is a drive timing diagram corresponding to the display panel provided in FIG. 9. Referring FIGS. 9 and 10, in an embodiment, N=6; the $1^{st}$ charge control line SW1 is electrically connected to the first control terminal 441 of the first switch device 440 and the second control terminal 442 of the sixth switch device 440, respectively; the $2^{nd}$ charge control line SW2 is electrically connected to the first control terminal 441 of the second switch device 440; the $3^{rd}$ charge control line SW3 is electrically connected to the first control terminal 441 of the third switch device 440, the second control terminal 442 of the first switch device 440, and the second control terminal 442 of the second switch device 440, respectively; the $4^{th}$ charge control line SW4 is electrically connected to the first control terminal 441 of the fourth switch device 440 and the second control terminal 442 of the third switch device 440, respectively; the $5^{th}$ charge control line SW5 is electrically connected to the first control terminal 441 of the fifth switch device 440 and the second control terminal 442 of the fourth switch device 440, respectively; and the $6^{th}$ charge control line SW6 is electrically connected to the first control terminal 441 of the sixth switch device 440 and the second control terminal 442 of the fifth switch device 440, respectively.

Exemplarily, referring to FIGS. 9 and 10, the data writing process and the reset process of each data line 100 are described below.

Time period t1: the signal on the $1^{st}$ charge control line SW1 is the low level, the 1st charge control line SW1 controls the first input 410 of the first switch device 440 to be in signal communication with the output 430 of the first switch device 440, the first input 410 of the first switch device 440 receives the data signal, and the data signal is written into the $1^{st}$ data line Data1 through the first switch device 440. At the same time, the $1^{st}$ charge control line SW1 controls the second input 420 of the sixth switch device 440 to be in signal communication with the output 430 of the sixth switch device 440, the second input 420 of the sixth switch device 440 receives the reset signal, and the reset signal is written into the $6^{th}$ data line Data6 through the sixth switch device 440 to reset the potential. At this time, the scan signal is the high level, and none of the sub-pixels is turned on, so data mischarging does not occur.

Time period t2: the signal on the $1^{st}$ charge control line SW1 is the high level, and the $1^{st}$ charge control line SW1 controls the first input 410 of the first switch device 440 to be not in signal communication with the output 430 of the first switch device 440. The scan signal is the low level, and all the sub-pixels are turned on. The data signal stored on the $1^{st}$ data line Data1 is written into the sub-pixel electrically connected to the $1^{st}$ data line Data1. The signal on the $2^{nd}$ charge control line SW2 is the low level, and the $2^{nd}$ charge control line SW2 controls the first input 410 of the second switch device 440 to be in signal communication with the output 430 of the second switch device 440. The first input 410 of the second switch device 440 receives the data signal, the data signal is written into the $2^{nd}$ data line Data2 through the second switch device 440, and at the same time, the data signal is also written into the sub-pixel electrically connected to the $2^{nd}$ data line Data2.

Time period t3: the signal on the $2^{nd}$ charge control line SW2 is the high level, and the $2^{nd}$ charge control line SW2 controls the first input 410 of the second switch device 440 to be not in signal communication with the output 430 of the second switch device 440. The scan signal is the low level, and all the sub-pixels are still turned on. The signal on the $3^{rd}$ charge control line SW3 is the low level, and the $3^{rd}$ charge control line SW3 controls the first input 410 of the third switch device 440 to be in signal communication with the output 430 of the third switch device 440. The first input 410 of the third switch device 440 receives the data signal, and the data signal is written into the $3^{rd}$ data line Data3 through the third switch device 440, and at the same time, the data signal is written into the sub-pixel electrically connected to the 3$^{rd}$ data line Data3. Meanwhile, the 3$^{rd}$ charge control line SW3 controls the second input 420 of the first switch device 440 to be in signal communication with the output 430 of the first switch device 440, and controls the second input 420 of the second switch device 440 to be in signal communication with the output 430 of the second switch device 440, the second inputs 420 of the first switch device 440 and the second switch device 440 both receive the reset signal, and through the first switch device 440 and the second switch device 440, the reset signal is transmitted to the 1$^{st}$ data line Data1 and the 2$^{nd}$ data line Data2, respectively, to reset the potential.

Time period t4: the signal on the 3$^{rd}$ charge control line SW3 is the high level, and the 3$^{rd}$ charge control line SW3 controls the first input 410 of the third switch device 440 to be not in signal communication with the output 430 of the third switch device 440. The scan signal is the low level, and all the sub-pixels are still turned on. The signal on the 4$^{th}$ charge control line SW4 is the low level, and the 4$^{th}$ charge control line SW4 controls the first input 410 of the fourth switch device 440 to be in signal communication with the output 430 of the fourth switch device 440. The first input 410 of the fourth switch device 440 receives the data signal, and the data signal is written into the 4$^{th}$ data line Data4 through the fourth switch device 440, and at the same time, the data signal is written into the sub-pixel electrically connected to the 4$^{th}$ data line Data4. Meanwhile, the 4$^{th}$ charge control line SW4 controls the second input 420 of the third switch device 440 to be in signal communication with the output 430 of the third switch device 440, the second input 420 of the third switch device 440 receives the reset signal, and through the third switch device 440, the reset signal is transmitted to the 3$^{rd}$ data line Data3 to reset the potential.

Time period t5: the signal on the 4$^{th}$ charge control line SW4 is the high level, and the 4$^{th}$ charge control line SW4 controls the first input 410 of the fourth switch device 440 to be not in signal communication with the output 430 of the fourth switch device 440. The scan signal is the low level, and all the sub-pixels are still turned on. The signal on the 5$^{th}$ charge control line SW5 is the low level, and the 5$^{th}$ charge control line SW5 controls the first input 410 of the fifth switch device 440 to be in signal communication with the output 430 of the fifth switch device 440. The first input 410 of the fifth switch device 440 receives the data signal, the data signal is written into the 5$^{th}$ data line Data5 through the fifth switch device 440, and at the same time, the data signal is written into the sub-pixel electrically connected to the 5$^{th}$ data line Data5. Meanwhile, the 5$^{th}$ charge control line SW5 controls the second input 420 of the fourth switch device 440 to be in signal communication with the output 430 of the fourth switch device 440, the second input 420 of the fourth switch device 440 receives the reset signal, and through the fourth switch device 440, the reset signal is transmitted to the 4$^{th}$ data line Data4 to reset the potential.

Time period t6: the signal on the 5$^{th}$ charge control line SW5 is the high level, and the 5$^{th}$ charge control line SW5 controls the first input 410 of the fifth switch device 440 to be not in signal communication with the output 430 of the fifth switch device 440. The scan signal is the low level, and all the sub-pixels are still turned on. The signal on the 6$^{th}$ charge control line SW6 is the low level, and the 6$^{th}$ charge control line SW6 controls the first input 410 of the sixth switch device 440 to be in signal communication with the output 430 of the sixth switch device 440. The first input 410 of the sixth switch device 440 receives the data signal, the data signal is written into the 6$^{th}$ data line Data6 through the sixth switch device 440, and at the same time, the data signal is written into the sub-pixel electrically connected to the 6$^{th}$ data line Data6. Meanwhile, the 6$^{th}$ charge control line SW6 controls the second input 420 of the fifth switch device 440 to be in signal communication with the output 430 of the fifth switch device 440, the second input 420 of the fifth switch device 440 receives the reset signal, and through the fifth switch device 440, the reset signal is transmitted to the 5$^{th}$ data line Data5 to reset the potential.

In the end, since each data line 100 is reset during gating after the data writing, it can be completely avoided that subsequent data cannot be written due to data pre-writing. Moreover, the reset process of any of all data lines 100 in the data line group overlaps with the data writing process of the other data lines 100, and thus the charging time can be prolonged and the display effect can be improved.

It should be noted that, in the embodiment, the second switch 402 and the first switch 401 may be placed side by side and vertical space can be saved.

Figure 11:
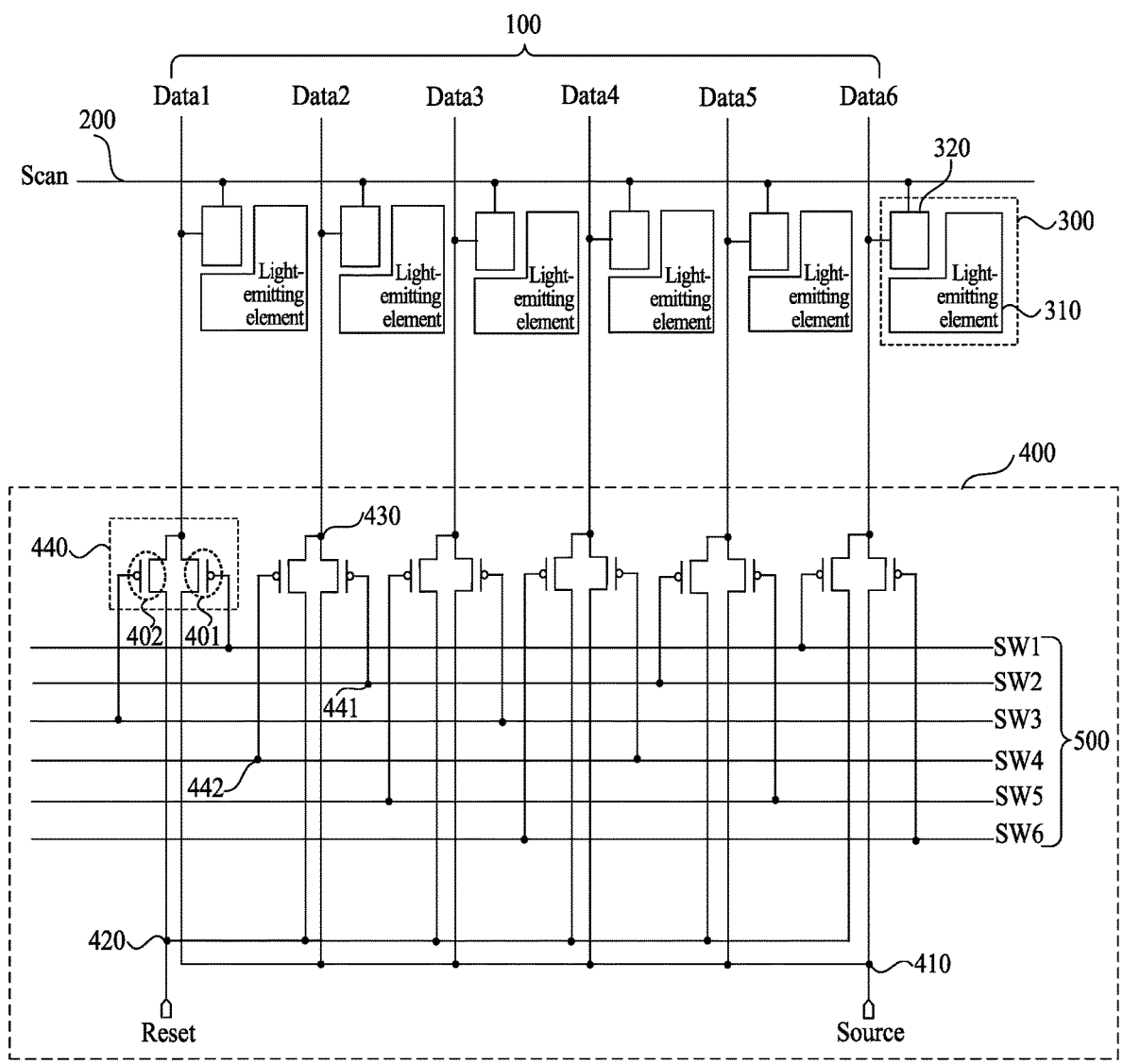
FIG. 11 is a structure diagram of another display panel according to an embodiment of the present disclosure.

FIG. 11 is a structure diagram of another display panel according to an embodiment of the present disclosure. Referring to FIG. 11, in an embodiment, N=6; the 1$^{st}$ charge control line SW1 is electrically connected to the first control terminal 441 of the first switch device 440 and the second control terminal 442 of the sixth switch device 440, respectively; the 2$^{nd}$ charge control line SW2 is electrically connected to the first control terminal 441 of the second switch device 440 and the second control terminal 442 of the fifth switch device 440, respectively; the 3$^{rd}$ charge control line SW3 is electrically connected to the first control terminal 441 of the third switch device 440 and the second control terminal 442 of the first switch device 440, respectively; the 4$^{th}$ charge control line SW4 is electrically connected to the first control terminal 441 of the fourth switch device 440 and the second control terminal 442 of the second switch device 440, respectively; the 5$^{th}$ charge control line SW5 is electrically connected to the first control terminal 441 of the fifth switch device 440 and the second control terminal 442 of the third switch device 440, respectively; and the 6$^{th}$ charge control line SW6 is electrically connected to the first control terminal 441 of the sixth switch device 440 and the second control terminal 442 of the fourth switch device 440, respectively.

Exemplarily, for the drive timing diagram of the display panel 10 shown in FIG. 11, reference may be made to FIG. 10, and the data writing process and the reset process of each data line 100 are described below.

Time period t1: the signal on the 1$^{st}$ charge control line SW1 is the low level, and the 1$^{st}$ charge control line SW1 controls the first input 410 of the first switch device 440 to be in signal communication with the output 430 of the first switch device 440, the first input 410 of the first switch device 440 receives the data signal, and the data signal is written into the 1$^{st}$ data line Data1 through the first switch device 440. At the same time, the 1$^{st}$ charge control line SW1 controls the second input 420 of the sixth switch device 440 to be in signal communication with the output 430 of the sixth switch device 440, the second input 420 of the sixth switch device 440 receives the reset signal, the reset signal is written into the 6$^{th}$ data line Data6 through the sixth switch device 440 to reset the potential. At this time, the scan signal is the high level, and none of the sub-pixels is turned on, so data mischarging does not occur.

Time period t2: the signal on the 1$^{st}$ charge control line SW1 is the high level, and the 1$^{st}$ charge control line SW1 controls the first input 410 of the first switch device 440 to be not in signal communication with the output 430 of the first switch device 440; the scan signal is the low level, all the sub-pixels are turned on, and the data signal stored on the $1^{st}$ data line Data1 is written into the sub-pixel electrically connected to the $1^{st}$ data line Data1. The signal on the $2^{nd}$ charge control line SW2 is the low-level, the $2^{nd}$ charge control line SW2 controls the first input 410 of the second switch device 440 to be in signal communication with the output 430 of the second switch device 440, the first input 410 of the second switch device 440 receives the data signal, the data signal is written into the $2^{nd}$ data line Data2 through the second switch device 440, and at the same time, the data signal is also written into the sub-pixel electrically connected to the $2^{nd}$ data line Data2. Meanwhile, the $2^{nd}$ charge control line SW2 controls the second input 420 of the fifth switch device 440 to be in signal communication with the output 430 of the fifth switch device 440, the second input 420 of the fifth switch device 440 receives the reset signal, and through the fifth switch device 440, the reset signal is transmitted to the $5^{th}$ data line Data5 to reset the potential.

Time period t3: the signal on the $2^{nd}$ charge control line SW2 is the high level, and the $2^{nd}$ charge control line SW2 controls the first input 410 of the second switch device 440 to be not in signal communication with the output 430 of the second switch device 440. The scan signal is the low level, and all the sub-pixels are still turned on. The signal on the $3^{rd}$ charge control line SW3 is the low level, and the $3^{rd}$ charge control line SW3 controls the first input 410 of the third switch device 440 to be in signal communication with the output 430 of the third switch device 440, the first input 410 of the third switch device 440 receives the data signal, and the data signal is written into the $3^{rd}$ data line Data3 through the third switch device 440, and at the same time, the data signal is also written into the sub-pixel electrically connected to the $3^{rd}$ data line Data3. Meanwhile, the $3^{rd}$ charge control line SW3 controls the second input 420 of the first switch device 440 to be in signal communication with the output 430 of the first switch device 440, the second input 420 of the first switch device 440 receives the reset signal, and through the first switch device 440, the reset signal is transmitted to the $1^{st}$ data line Data1 to reset the potential.

Time period t4: the signal on the $3^{rd}$ charge control line SW3 is the high level, and the $3^{rd}$ charge control line SW3 controls the first input 410 of the third switch device 440 to be not in signal communication with and the output 430 of the third switch device 440. The scan signal is the low level, and all the sub-pixels are still turned on. The signal on the $4^{th}$ charge control line SW4 is the low level, and the $4^{th}$ charge control line SW4 controls the first input 410 of the fourth switch device 440 to be in signal communication with the and the output 430 of the fourth switch device 440, the first input 410 of the fourth switch device 440 receives the data signal, and the data signal is written into the $4^{th}$ data line Data4 through the fourth switch device 440, and at the same time, the data signal is also written into the sub-pixel electrically connected to the $4^{th}$ data line Data4. Meanwhile, the $4^{th}$ charge control line SW4 controls the second input 420 of the second switch device 440 to be in signal communication with the output 430 of the second switch device 440, the second input 420 of the second switch device 440 receives the reset signal, and through the second switch device 440, the reset signal is transmitted to the $2^{nd}$ data line Data2 to reset the potential.

Time period t5: the signal on the $4^{th}$ charge control line SW4 is the high level, and the $4^{th}$ charge control line SW4 controls the first input 410 of the fourth switch device 440 to be not in signal communication with the output 430 of the fourth switch device 440. The scan signal is the low level, and all the sub-pixels are still turned on. The signal on the $5^{th}$ charge control line SW5 is the low-level, the $5^{th}$ charge control line SW5 controls the first input 410 of the fifth switch device 440 to be in signal communication with the output 430 of the fifth switch device 440, the first input 410 of the fifth switch device 440 receives the data signal, and the data signal is written into the $5^{th}$ data line Data5 through the fifth switch device 440, and at the same time, the data signal is also written into the sub-pixel electrically connected to the $5^{th}$ data line Data5. Meanwhile, the $5^{th}$ charge control line SW5 controls the second input 420 of the third switch device 440 to be in signal communication with the output 430 of the third switch device 440, the second input 420 of the third switch device 440 receives the reset signal, and through the third switch device 440, the reset signal is transmitted to the $3^{rd}$ data line Data3 to reset the potential.

Time period t6: the signal on the $5^{th}$ charge control line SW5 is the high level, and the $5^{th}$ charge control line SW5 controls the first input 410 of the fifth switch device 440 to be not in signal communication with the output 430 of the fifth switch device 440. The scan signal is the low level, and all the sub-pixels are still turned on. The signal on the $6^{th}$ charge control line SW6 is the low level, and the $6^{th}$ charge control line SW6 controls the first input 410 of the sixth switch device 440 to be in signal communication with the output 430 of the sixth switch device 440, the first input 410 of the sixth switch device 440 receives the data signal, and the data signal is written into the $6^{th}$ data line Data6 through the sixth switch device 440, and at the same time, the data signal is also written into the sub-pixel electrically connected to the $6^{th}$ data line Data6. Meanwhile, the $6^{th}$ charge control line SW6 controls the second input 420 of the fourth switch device 440 to be in signal communication with the output 430 of the fourth switch device 440, the second input 420 of the fourth switch device 440 receives the reset signal, and through the fourth switch device 440, the reset signal is transmitted to the $4^{th}$ data line Data4 to reset the potential.

In the end, since each data line 100 is reset during gating after the data writing, it can be completely avoided that subsequent data cannot be written due to data pre-charge. The reset process of any of all the data lines 100 in the data line group overlaps with the data writing process of the other data lines 100, and the charging time can be prolonged and the display effect can be improved.

It should be noted that, in the embodiment, the second switch 402 and the first switch 401 may be placed in the same column, thus saving the horizontal space.

To sum up, for different space constraints, the switch devices 440 may be placed in various ways. Exemplarily, when the horizontal space is relatively small, the second switch 402 and the first switch 401 in the switch device 440 may be placed in the same column; when the horizontal space is relatively large, the second switch 402 may be placed side by side with the first switch 401 to save the vertical space.

The reset signal is usually a low-level signal. To further simplify the circuit layout, an existing signal terminal in the display panel 10 may be configured to provide the reset signal to the multi-path selection circuit 400. Usually, the potential signals provided by different signal terminals are different, and the driving capability of different potential signals to the switch device 440 is also different. Therefore, the size of the switch device 440 is related to the selection of the reset signal and needs to guarantee that the parasitic voltage on the data line 100 is pulled down from the highest voltage (e.g., 7V) to below the lowest voltage (e.g., 2V) within one turned-on pulse time of the control signal transmitted by the charge control line 500. The signal terminals for providing the reset signal and the size of the switch devices 440 which matches the reset signal are described below.

Figure 12:
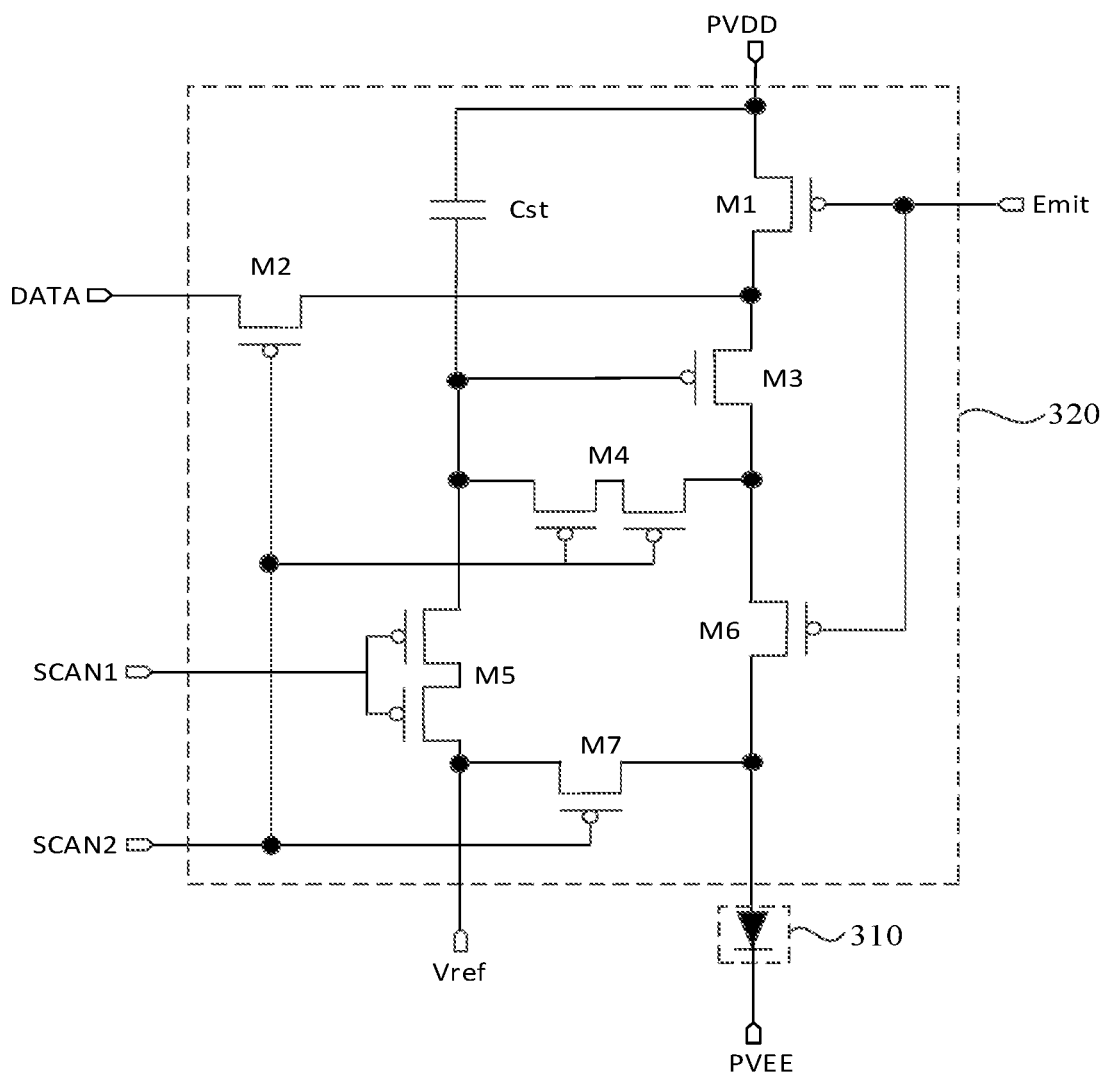
FIG. 12 is a structure diagram of a sub-pixel according to an embodiment of the present disclosure.

FIG. 12 is a structure diagram of a sub-pixel according to an embodiment of the present disclosure. Referring to FIG. 11 and FIG. 12, in an embodiment, the display panel 10 may further include N columns of sub-pixels 300, each sub-pixel 300 includes a pixel circuit 320 and a light-emitting element 310 electrically connected to each other; the pixel circuit 320 includes a low voltage signal terminal PVEE for providing the reset signal. In an embodiment, $A_2 > A_1/22$, $A_1$ is the width-to-length ratio of the first switch 401 in the switch device 440 and $A_2$ is the width-to-length ratio of the second switch 402 in the switch device 440.

In the embodiment, the low voltage signal terminal PVEE of the pixel circuit 320 may be electrically connected to the second input 420 of the switch devices 440 to provide the reset signal. The low voltage signal terminal PVEE is usually −3V, and the size of the switch devices 440 which matches the reset signal provided by the low voltage signal terminal PVEE needs to be met that the width-length ratio $A_2$ of the second switch 402 is greater than $1/22$ of the width-length ratio $A_1$ of the first switch 401.

Referring to FIGS. 11 and 12, in an embodiment, the display panel may further include N columns of sub-pixels 300, each sub-pixel 300 includes a pixel circuit 320 and a light-emitting element 310 which are electrically connected; and the pixel circuit 320 includes a reference voltage terminal Vref for providing the reset signal. In an embodiment, $A_2 > A_1/24$, $A_1$ is the width-to-length ratio of the first switch 401 in the switch device 440, and $A_2$ is the width-to-length ratio of the second switch 402 in the switch device 440.

In the embodiment, the reference voltage terminal Vref of the pixel circuit 320 may be electrically connected to the second input 420 of the switch devices 440 to provide the reset signal. The reference voltage terminal Vref is usually −4V, and the size of the switch devices 440 which matches the reset signal provided by the reference voltage terminal Vref needs to be met that the width-to-length ratio $A_2$ of the second switch 402 is greater than $1/24$ of the width-to-length ratio $A_1$ of the first switch 401.

Figure 13:
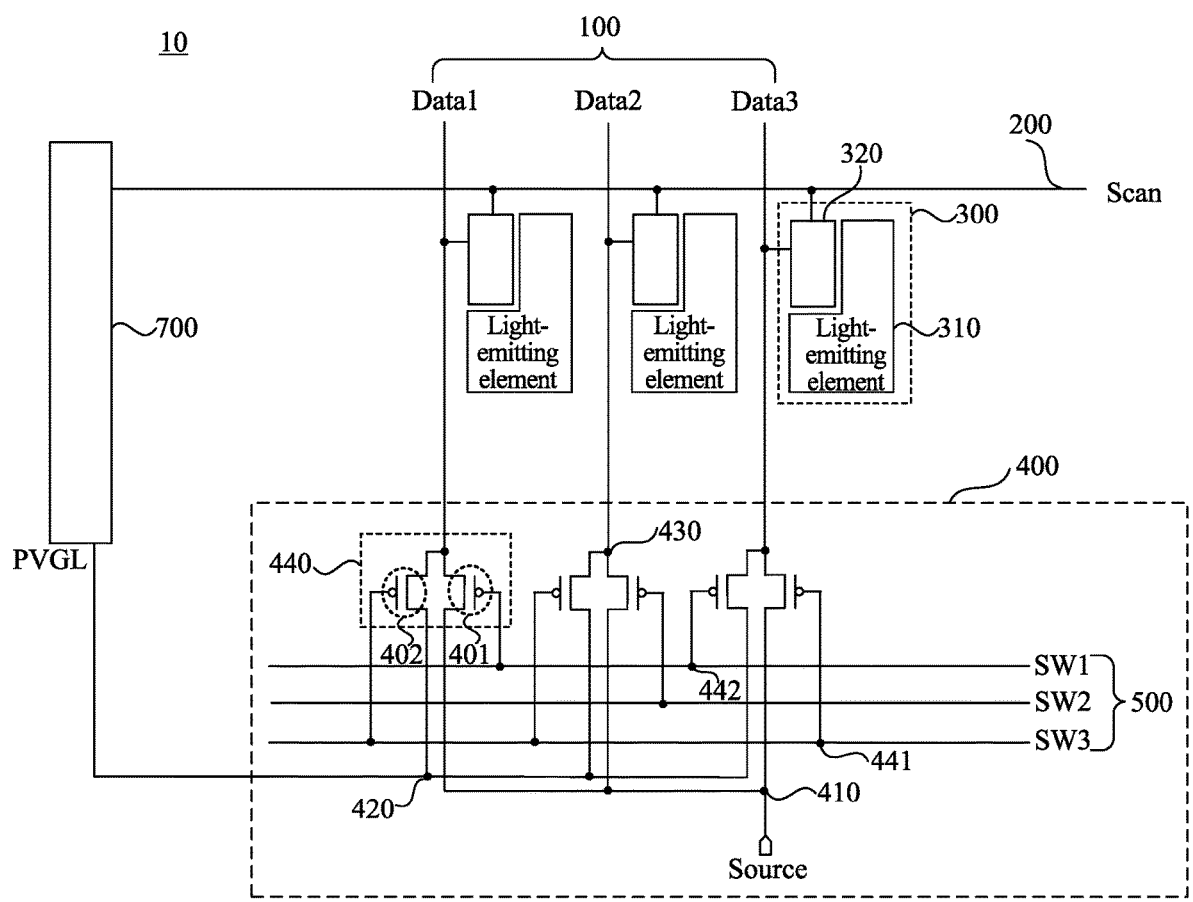
FIG. 13 is a structure diagram of another display panel according to an embodiment of the present disclosure.

It should be noted that potential signals provided by different signal terminals are usually different, and the selection of different potential signals affects the size of the switch devices 440, that is, the lower the potential signal provided by the signal terminals is, the smaller the size of the switch devices 440 in need is. In addition, another consideration for signal selection is the difficulty of acquiring a signal in an actual film layer. For the above three signal terminals, the ascending order of difficulty in acquiring the signal is successive: PVEE<PVGL<Vref. FIG. 13 is a structure diagram of another display panel according to an embodiment of the present disclosure. Referring to FIG. 13, in an embodiment, the display panel 10 may further include a shift register circuit 700, the shift register circuit 700 includes a low power signal terminal PVGL, and the low power signal terminal PVGL provides the reset signal. In an embodiment, $A_2 > A_1/26$, $A_1$ is the width-to-length ratio of the first switch 401 in the switch device 440, and $A_2$ is the width-to-length ratio of the second switch 402 in the switch device 440.

In the embodiment, the low power signal terminal PVGL of the shift register circuit 700 may be electrically connected to the second input 420 of the switch devices 440 to provide the reset signal. The low power signal terminal PVGL is usually −7V, and the size of the switch devices 440 which matches the reset signal provided by the low power signal terminal PVGL needs to be met that the width-length ratio $A_2$ of the second switch 402 is greater than $1/26$ of the width-length ratio $A_1$ of the first switch 401.

It should be noted that in the display panel 10, not only the shift register circuit 700 is provided with the low power signal terminal, but also other drive circuits such as a driver integrated circuit (IC) are also provided with the low power signal terminal. Any circuit provided with the low power signal terminal can provide the reset signal.

In addition, the above description only takes an example of the low voltage signal terminal PVEE at −3V, the reference voltage terminal Vref usually at −4V, and the low power signal terminal PVGL usually at −7V to illustrate that the potentials of different signal terminals are different. When the circuit requirements are different, voltage values of the signal terminals are also different.

Referring to FIG. 13, in an embodiment, the display panel 10 may include a light-emitting element 310; and the light-emitting element 310 may be an inorganic light-emitting diode or an organic light-emitting diode.

The light-emitting element 310 may be the inorganic light-emitting diode such as a micro light-emitting diode (LED) or mini LED. The display panel 10 provided with the inorganic light-emitting diode has the advantages of high brightness, low operating voltage, low power consumption, long service life, impact resistance, stable performance and so on. The light-emitting element 310 may also be the organic light-emitting diode. The display panel 10 provided with the organic light-emitting diode has the advantages of self-luminescence, low driving voltage, high luminous efficiency, short response time, flexible display, and so on.

Figure 14:
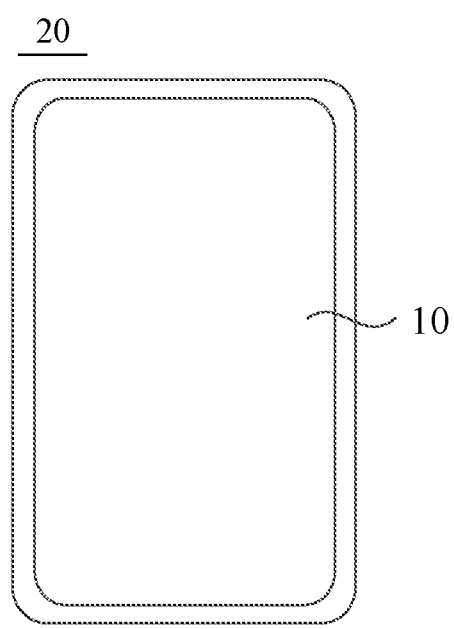
FIG. 14 is a structure diagram of a display device according to an embodiment of the present disclosure.

Based on the same concept, an embodiment of the present disclosure also provides a display device. FIG. 14 is a structure diagram of a display device according to an embodiment of the present disclosure. Referring to FIG. 14, the display device 20 includes the display panel 10 provided by any embodiment of the present disclosure and has the corresponding functions and beneficial effects of the display panel 10.

It should be noted that in this specification, various embodiments are described progressively, and each of the embodiments focuses on the difference with the other embodiments in terms of the illustration, and the same or similar parts between the various embodiments may refer to each other.

It is to be noted that the preceding are merely exemplary embodiments of the present disclosure and the principles used therein. It is to be understood by those skilled in the art that the present disclosure is not limited to the embodiments described herein. Those skilled in the art can make various apparent changes, adaptation, combinations, and substitution without departing from the scope of the present disclosure. Therefore, although the present disclosure has been described in detail through the preceding embodiments, the present disclosure is not limited to the preceding embodiments and may include more other equivalent embodiments without departing from the concept of the present disclosure. The scope of the present disclosure is determined by the scope of the appended claims.

What is claimed is:
1. A display panel, comprising:
a plurality of data lines arranged along a row direction, and a multi-path selection circuit, wherein operation of the plurality of data lines comprises a data writing phase; and at least one data line of the plurality of data lines meets the following: the at least one data line receives a data signal, and at least one of the plurality of data lines except the at least one data line receiving the data signal receives a reset signal simultaneously;

wherein the multi-path selection circuit comprises a first input, a second input and N outputs, the first input receives the data signal, the second input receives the reset signal, the N outputs are electrically connected to N data lines, respectively, the N data lines form a data line group, and N is an integer greater than or equal to 3;

the multi-path selection circuit is configured to control the first input to be in signal communication with the N outputs in a time-division manner; and at least one data line in the data line group meets the following:

the at least one data line in the data line group receives the data signal, and the second input is in signal communication with at least one of the N outputs except an output being in signal communication with the at least one data line simultaneously.

2. The display panel of claim 1, wherein the multi-path selection circuit comprises N switch devices, the N switch devices are $1^{st}$ through $N^{th}$ switch devices, an output of an $i^{th}$ switch device is electrically connected to an $i^{th}$ data line in the data line group correspondingly, and $1 \leq i \leq N$;

the N switch devices comprise first-type switch devices and second-type switch devices, each of the first-type switch devices comprises a first input and a first control terminal, and each of the second-type switch devices comprises a first input, a first control terminal, a second input and a second control terminal;

the first control terminal of each of the first-type switch devices is configured to control the first input of the respective first-type switch device to be in signal communication with an output of the respective first-type switch device or to be not in signal communication with an output of the respective first-type switch device, the first control terminal of each of the second-type switch devices is configured to control the first input of the respective second-type switch device to be in signal communication with an output of the respective second-type switch device or to be not in signal communication with an output of the respective second-type switch device, and the second control terminal of each of the second-type switch devices is configured to control the second input of the respective second-type switch device to be in signal communication with an output of the respective second-type switch device or to be not in signal communication with an output of the respective second-type switch device.

3. The display panel of claim 2, wherein a number of the second-type switch devices among the N switch devices is M, and M is less than N; and the display panel further comprises at least one reset control line, the at least one reset control line is electrically connected to second control terminals of the second-type switch devices, and the at least one reset control line is configured to control the second input of a respective second-type switch device to be in signal communication with an output of the respective second-type switch device or to be not in signal communication with an output of the respective second-type switch device.

4. The display panel of claim 1, wherein the multi-path selection circuit comprises N switch devices, the N switch devices are $1^{st}$ through $N^{th}$ switch devices, an output of an $i^{th}$ switch device is electrically connected to an $i^{th}$ data line in the data line group correspondingly, and $1 \leq i \leq N$; and each of the N switch devices comprises a first input and a first control terminal, the first control terminal of each of the N switch devices is configured to control the first input of the respective switch device to be in signal communication with an output of the respective switch device or to be not in signal communication with an output of the respective switch device;

wherein the display panel further comprises $1^{st}$ through $N^{th}$ charge control lines, an $i^{th}$ charge control line is electrically connected to the first control terminal of the $i^{th}$ switch device and is configured to control the first input of the $i^{th}$ switch device to be in signal communication with the output of the $i^{th}$ switch device or to be not in signal communication with the output of the $i^{th}$ switch device.

5. The display panel of claim 4, wherein each of the N switch devices further comprises a second input and a second control terminal, and the second control terminal is configured to control the second input of the respective switch device to be in signal communication with an output of the respective switch device or not to be in signal communication with an output of the respective switch device; and the display panel further comprises at least two reset control lines;

wherein each of the at least two reset control lines is electrically connected to the second control terminal of at least one of the N switch devices, and the at least two reset control lines are configured to control second inputs of respective switch devices to be in signal communication with outputs of the respective switch devices simultaneously or to be not in signal communication with outputs of the respective switch devices simultaneously.

6. The display panel of claim 4, wherein each of the N switch devices further comprises a second input and a second control terminal, and the second control terminal is configured to control the second input of the respective switch device to be in signal communication with the output of the respective switch device or not to be in signal communication with the output of the respective switch device;

at least one of the charge control lines is also used as a reset control line and is electrically connected to the first control terminal of the $i^{th}$ switch device and the second control terminal of a $j^{th}$ switch device, respectively, and the at least one of the charge control lines is configured to control the first input of the $i^{th}$ switch device to be in signal communication with the output of the $i^{th}$ switch device, and to control the second input of the $i^{th}$ switch device to be in signal communication with an output of the $j^{th}$ switch device simultaneously, and $i \neq j$.

7. The display panel of claim 6, wherein one of the N switch devices comprises a first switch and a second switch;

an input of the first switch receives the data signal, and a control terminal of the first switch is electrically connected to one of the charge control lines; an input of the second switch receives the reset signal, and a control terminal of the second switch is electrically connected to the reset control line; an output of the first switch and an output of the second switch are electrically connected to a same data line; and the charge control lines and the reset control line are configured to control the first switch and the second switch in the one switch device to be turned on in the time-division manner.

8. The display panel of claim 6, wherein N=3;
a $1^{st}$ charge control line is electrically connected to the first control terminal of a first switch device and the second control terminal of a third switch device, respectively;
a $2^{nd}$ charge control line is electrically connected to the first control terminal of a second switch device; and
a $3^{rd}$ charge control line is electrically connected to the first control terminal of the third switch device, the second control terminal of the first switch device and the second control terminal of the second switch device, respectively.

9. The display panel of claim 6, wherein N=6;
a $1^{st}$ charge control line is electrically connected to the first control terminal of a first switch device and the second control terminal of a sixth switch device, respectively;
a $2^{nd}$ charge control line is electrically connected to the first control terminal of a second switch device;
a $3^{rd}$ charge control line is electrically connected to the first control terminal of a third switch device, the second control terminal of the first switch device and the second control terminal of the second switch device, respectively;
a $4^{th}$ charge control line is electrically connected to the first control terminal of a fourth switch device and the second control terminal of the third switch device, respectively;
a $5^{th}$ charge control line is electrically connected to the first control terminal of a fifth switch device and the second control terminal of the fourth switch device, respectively; and
a $6^{th}$ charge control line is electrically connected to the first control terminal of a sixth switch device and the second control terminal of the fifth switch device, respectively.

10. The display panel of claim 6, wherein N=6;
a $1^{st}$ charge control line is electrically connected to the first control terminal of a first switch device and the second control terminal of a sixth switch device, respectively;
a $2^{nd}$ charge control line is electrically connected to the first control terminal of a second switch device and the second control terminal of a fifth switch device, respectively;
a $3^{rd}$ charge control line is electrically connected to the first control terminal of a third switch device and the second control terminal of the first switch device, respectively;
a $4^{th}$ charge control line is electrically connected to the first control terminal of a fourth switch device and the second control terminal of the second switch device, respectively;
a $5^{th}$ charge control line is electrically connected to the first control terminal of the fifth switch device and the second control terminal of the third switch device, respectively; and
a $6^{th}$ charge control line is electrically connected to the first control terminal of the sixth switch device and the second control terminal of the fourth switch device, respectively.

11. The display panel of claim 7, wherein the first switch and the second switch are P-type transistors.

12. The display panel of claim 7, further comprising: N columns of sub-pixels, wherein each sub-pixel of the N columns of sub-pixels comprises a pixel circuit and a light-emitting element electrically connected to the pixel circuit; and
the pixel circuit comprises a low voltage signal terminal, and the low voltage signal terminal provides the reset signal;
wherein $A_2 > A_1/22$, wherein $A_1$ is a width-to-length ratio of the first switch in the one switch device, and $A_2$ is a width-to-length ratio of the second switch in the one switch device.

13. The display panel of claim 7, further comprising: N columns of sub-pixels, wherein each sub-pixel of the N columns of sub-pixels comprises a pixel circuit and a light-emitting element electrically connected to the pixel circuit; and
the pixel circuit comprises a reference voltage terminal, and the reference voltage terminal provides the reset signal;
wherein $A_2 > A_1/24$, wherein $A_1$ is a width-to-length ratio of the first switch in the one switch device, and $A_2$ is a width-to-length ratio of the second switch in the one switch device.

14. The display panel of claim 7, further comprising: a shift register circuit, wherein the shift register circuit comprises a low power signal terminal, and the low power signal terminal provides the reset signal;
wherein $A_2 > A_1/26$, wherein $A_1$ is a width-to-length ratio of the first switch in the one switch device, and $A_2$ is a width-to-length ratio of the second switch in the one switch device.

15. The display panel of claim 1, wherein the multi-path selection circuit is configured to sequentially provide the data signal for $1^{st}$ through $N^{th}$ data lines in the data line group; and
during the data writing phase of one of a $3^{rd}$ data line to an $N^{th}$ data line, a $1^{st}$ data line receives the reset signal.

16. The display panel of claim 1, wherein the multi-path selection circuit is configured to sequentially provide the data signal for $1^{st}$ through $N^{th}$ data lines in the data line group;
the operation of the plurality of data lines further comprises a data reset phase; and
the data reset phase of a $p^{th}$ data line overlaps with the data writing phase of a $q^{th}$ data line, wherein $2 \leq p \leq N-1$, $1 \leq q \leq N$, and $p \neq q$.

17. The display panel of claim 1, wherein the multi-path selection circuit is configured to sequentially provide the data signal for $1^{st}$ through $N^{th}$ data lines in the data line group; and
during the data writing phase of a $1^{st}$ data line, an $N^{th}$ data line receives the reset signal.

18. A display device, comprising:
a display panel;
wherein the display panel comprises a plurality of data lines arranged along a row direction and a multi-path selection circuit, and operation of the plurality of data lines comprises a data writing phase; and at least one data line of the plurality of data lines meets the following:
the at least one data line receives a data signal, and at least one of the plurality of data lines except the at least one data line receiving the data signal receives a reset signal simultaneously;
wherein the multi-path selection circuit comprises a first input, a second input and N outputs, the first input receives the data signal, the second input receives the reset signal, the N outputs are electrically connected to N data lines, respectively, the N data lines form a data line group, and N is an integer greater than or equal to 3;

the multi-path selection circuit is configured to control the first input to be in signal communication with the N outputs in a time-division manner; and at least one data line in the data line group meets the following:

the at least one data line in the data line group receives the data signal, and the second input is in signal communication with at least one of the N outputs except an output being in signal communication with the at least one data line simultaneously.

19. The display device of claim 18, wherein the display panel comprises a light-emitting element; and the light-emitting element is an inorganic light-emitting diode or an organic light-emitting diode.

\* \* \* \* \*